(12) United States Patent
Sakamoto

(10) Patent No.: US 9,967,393 B2
(45) Date of Patent: May 8, 2018

(54) MOBILE ELECTRONIC APPARATUS, METHOD FOR CONTROLLING MOBILE ELECTRONIC APPARATUS, AND NON-TRANSITORY COMPUTER READABLE RECORDING MEDIUM

(71) Applicant: KYOCERA CORPORATION, Kyoto (JP)

(72) Inventor: Seiya Sakamoto, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/276,518

(22) Filed: Sep. 26, 2016

(65) Prior Publication Data

US 2017/0094051 A1    Mar. 30, 2017

(30) Foreign Application Priority Data

Sep. 28, 2015  (JP) ................................. 2015-189607

(51) Int. Cl.
*H04M 1/725*  (2006.01)
*G08B 3/10*  (2006.01)
*G08B 5/22*  (2006.01)
*H04M 1/57*  (2006.01)

(52) U.S. Cl.
CPC ...... *H04M 1/72597* (2013.01); *G08B 3/1025* (2013.01); *G08B 5/224* (2013.01); *H04M 1/578* (2013.01); *H04M 1/72569* (2013.01); *H04M 2250/12* (2013.01); *H04M 2250/74* (2013.01)

(58) Field of Classification Search
CPC ... H04W 4/023; H04W 4/046; H04W 52/027; H04W 52/0251; G08B 3/1025; G08B 5/224; H04M 1/578; H04M 1/72569; H04M 1/72597; H04M 2250/74
See application file for complete search history.

(56) References Cited

U.S. PATENT DOCUMENTS

| | | | | |
|---|---|---|---|---|
| 2011/0319128 A1* | 12/2011 | Miwa | ..................... | H04W 88/06 455/550.1 |
| 2015/0365540 A1* | 12/2015 | Davis | .................. | H04M 19/042 455/567 |
| 2016/0054808 A1* | 2/2016 | Cho | ........................ | G06F 3/017 345/156 |
| 2016/0366639 A1* | 12/2016 | Alameh | .............. | H04W 52/027 |

FOREIGN PATENT DOCUMENTS

| | | |
|---|---|---|
| JP | 2004-304297 | 10/2004 |
| JP | 2015-061130 | 3/2015 |

* cited by examiner

*Primary Examiner* — Thanh Le

(74) *Attorney, Agent, or Firm* — Duane Morris LLP

(57) ABSTRACT

A mobile electronic apparatus, a method for controlling a mobile electronic apparatus, and a non-transitory computer readable recording medium are disclosed. A wireless communication unit receives an incoming call signal. A movement detector detects a user's movement. A proximity sensor detects the proximity of an object. At least one processor outputs as a voice, through a sound output unit, information on a party that has transmitted the incoming call signal when the user's movement and the proximity of the object are detected during the receipt of the incoming call signal.

9 Claims, 13 Drawing Sheets

F I G. 1 7
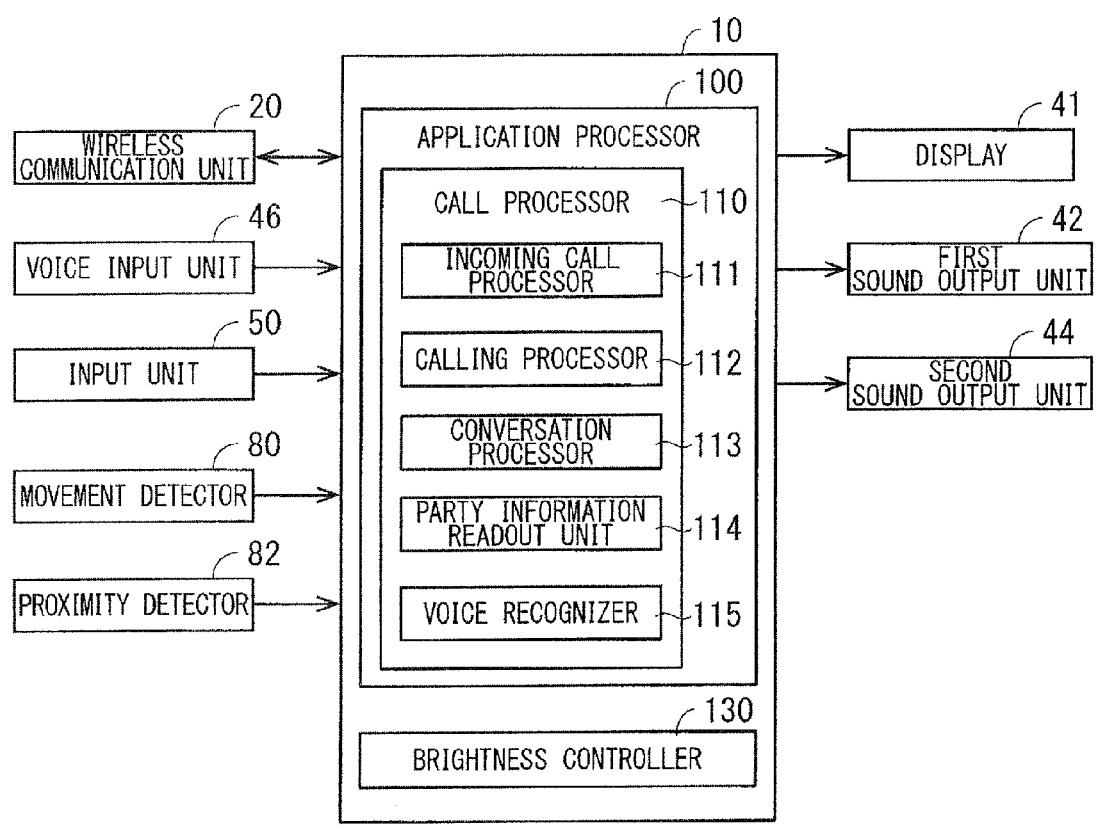

MOBILE ELECTRONIC APPARATUS, METHOD FOR CONTROLLING MOBILE ELECTRONIC APPARATUS, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2015-189607, filed on Sep. 28, 2015, entitled "MOBILE ELECTRONIC APPARATUS". The content of which is incorporated by reference herein in its entirety.

FIELD

Embodiments of the present disclosure relate to a mobile electronic apparatus, a method for controlling mobile electronic apparatus, and a non-transitory computer readable recording medium.

BACKGROUND

The use of a mobile terminal during walking is dangerous because a user may move while looking at the mobile terminal without looking at the direction of movement.

SUMMARY

A mobile electronic apparatus, a method for controlling a mobile electronic apparatus, and a non-transitory computer readable recording medium are disclosed. In one embodiment, a mobile electronic apparatus comprises a wireless communication unit, a sound output unit, a movement detector, a proximity sensor, and at least one processor. The wireless communication unit is configured to receive an incoming call signal. The movement detector is configured to detect a user's movement. The proximity sensor is configured to detect the proximity of an object. The at least one processor is configured to output as a voice, through the sound output unit, information on a party that has transmitted the incoming call signal when the user's movement and the proximity of the object are detected during the receipt of the incoming call signal.

In another embodiment, a mobile electronic apparatus comprises a wireless communication unit, a sound output unit, a movement detector, and a proximity sensor. A method for controlling a mobile electronic apparatus comprises outputting, through a sound output unit, information on a party that has transmitted an incoming call signal when a user's movement and the proximity of an object are detected during the receipt of the incoming call signal.

In another embodiment, a non-transitory computer readable recording medium stores a control program so as to cause a mobile electronic apparatus to perform first and second steps below. In the first step, an incoming call is received by a wireless communication unit. In the second step, when a movement detector and a proximity sensor detect a user's movement and the proximity of an object, respectively, during the receipt of the incoming call signal, information on a party that has transmitted the incoming call signal is output as a voice through a sound output unit.

BRIEF DESCRIPTION OF THE DRAWINGS

FIG. 17 schematically illustrates an example configuration of a controller.

DETAILED DESCRIPTION

First Embodiment

Mobile Electronic Apparatus

External Appearance

Figure 1:
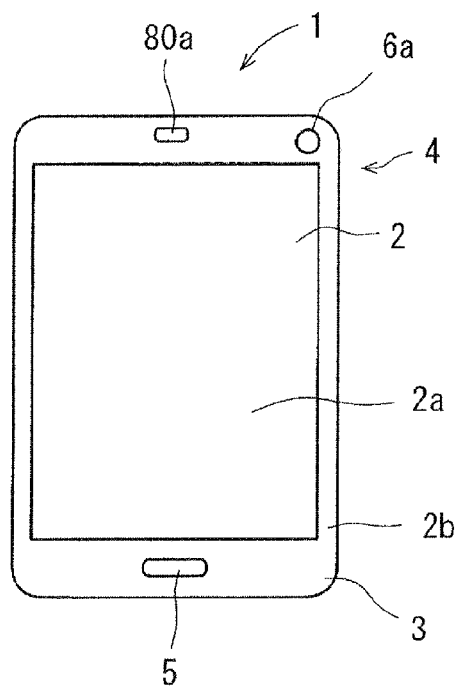
FIG. 1 illustrates a front view of an example of an overview of a mobile electronic apparatus.
Figure 2:
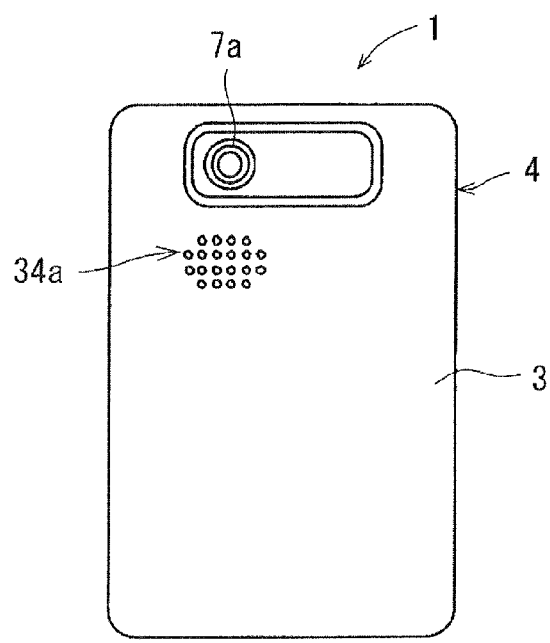
FIG. 2 illustrates a rear view of the example of the overview of the mobile electronic apparatus.

FIG. 1 illustrates an example of an overview of a mobile electronic apparatus 1 as viewed from the front side. FIG. 2 illustrates a rear view of the example of the overview of the mobile electronic apparatus 1. Examples of the mobile electronic apparatus 1 include tablets, personal digital assistants (PDAs), mobile phones including smartphones, and mobile personal computers.

In the example of FIGS. 1 and 2, the mobile electronic apparatus 1 includes a cover panel 2 and a case part 3. The combination of the cover panel 2 and the case part 3 comprises a case 4 forming a plate approximately rectangular in a plan view (hereinafter also referred to as an "apparatus case").

The cover panel 2 is approximately rectangular in a plan view, and is a portion other than the peripheral end in the front portion of the mobile electronic apparatus 1. The cover panel 2 is formed of, for example, a transparent glass or a transparent acrylic resin. Alternatively, the cover panel 2 is made of for example, sapphire. Sapphire is a single crystal mainly containing alumina ($Al_2O_3$), and herein is a single crystal whose purity of $Al_2O_3$ is approximately 90% or greater. The purity of $Al_2O_3$ is preferably greater than or equal to 99% to provide a greater resistance to damage of the cover panel 2.

The cover panel 2 may be a composite panel (laminated panel) with a multiple layer structure including a layer made of sapphire. For example, the cover panel 2 may be a composite panel with a two-layer structure of a first layer made of sapphire and located on the surface of the mobile electronic apparatus 1 (a sapphire panel), and a second layer made of glass and stuck on the first layer (a glass panel). The cover panel 2 may be a composite panel with a three-layer structure of a first layer made of sapphire and located on the surface of the mobile electronic apparatus 1 (a sapphire panel), a second layer made of glass and stuck on the first layer (a glass panel), and a third layer made of sapphire and stuck on the second layer (a sapphire panel). Alternatively, the cover panel 2 may comprise a layer made of one of crystalline materials other than sapphire, such as diamond, zirconia, titania, crystal, lithium tantalite, and aluminum oxynitride.

The case part 3 comprises the peripheral end in the front portion, the side portion, and the rear portion of the mobile electronic apparatus 1. The case part 3 is made of, for example, polycarbonate resin.

The front surface of the cover panel 2 comprises a display area 2a on which various pieces of information such as characters, symbols, figures, and images are displayed. The display area 2a is, for example, rectangular in a plan view. A peripheral edge 2b of the cover panel 2 surrounding the display area 2a is opaque because of, for example, a film attached thereto, and is a non-display portion on which no information is displayed. A touch panel 52 described below is stuck on the rear surface of the cover panel 2. The user can provide various instructions to the mobile electronic apparatus 1 by operating the display area 2a on the front surface of the mobile electronic apparatus 1 with, for example, the finger. The user can provide the various instructions to the mobile electronic apparatus 1 also by operating the display area 2a with an operator other than the finger, such as, pens for electrostatic touch panels including a stylus pen.

The apparatus case 4 comprises, for example, an operation key 5. The operation key 5 is, for example, a hardware key, and is located, for example, at the lower end on the front surface of the cover panel 2.

The touch panel 52 and the operation key 5 are examples of an input unit through which the user enters data into the mobile electronic apparatus 1. Various inputs described below may be entered through the touch panel 52 or the operation key 5.

Electrical Configuration of Mobile Electronic Apparatus

Figure 3:
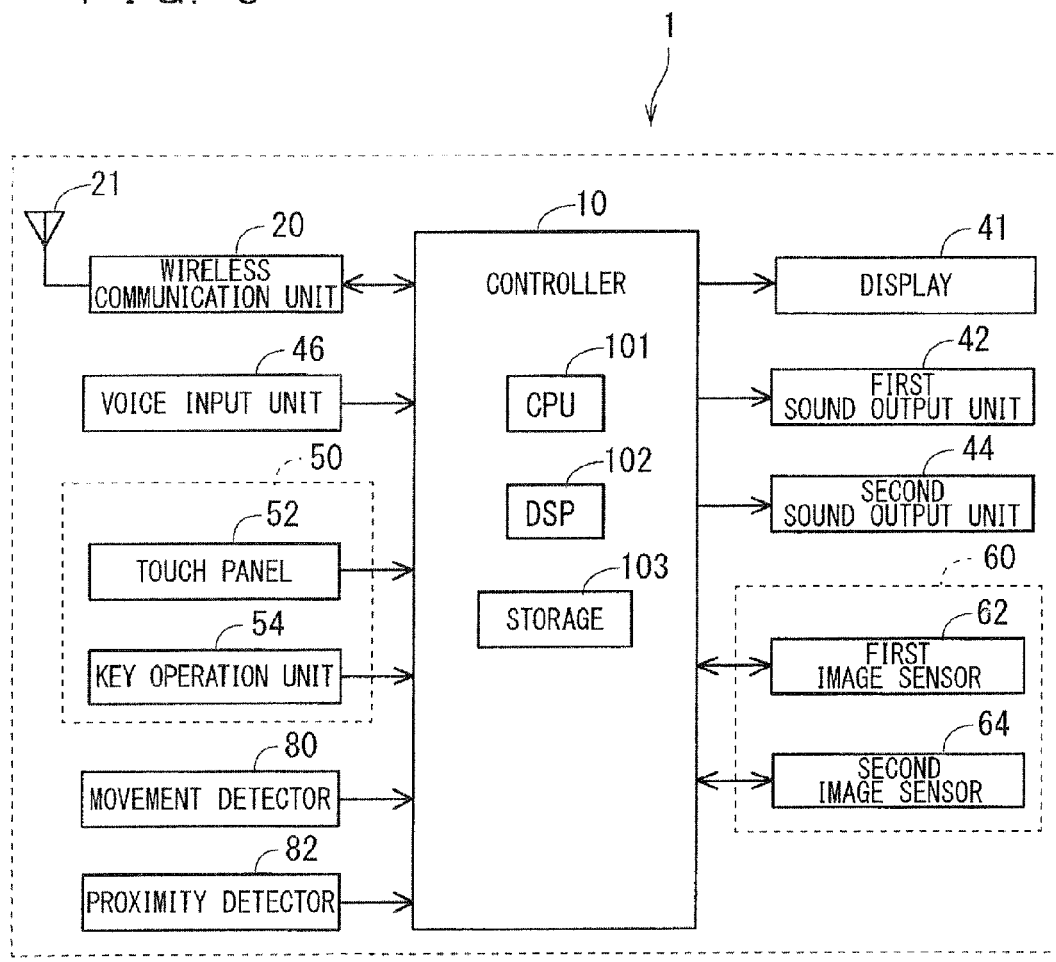
FIG. 3 schematically illustrates an example of an electrical configuration of the mobile electronic apparatus.

FIG. 3 illustrates a block diagram showing an example of an electrical configuration of the mobile electronic apparatus 1. The mobile electronic apparatus 1 illustrated in FIG. 3 includes, for example, a controller 10, a wireless communication unit 20, a display 41, a first sound output unit (herein a receiver) 42, a second sound output unit (herein a speaker) 44, a voice input unit 46, the touch panel 52, a key operation unit 54, an image sensor 60, a movement detector 80, and a proximity detector 82. The apparatus case 4 accommodates these constituent elements of the mobile electronic apparatus 1.

The controller 10 includes, for example, a central processing unit (CPU) 101, a digital signal processor (DSP) 102, and a storage 103. The controller 10 can manage the overall action of the mobile electronic apparatus 1 by controlling the other constituent elements of the mobile electronic apparatus 1. The storage 103 includes, for example, a read only memory (ROM) and a random access memory (RAM). The storage 103 stores, for example, main programs and application programs (simply referred to as "applications" hereinafter). The main programs are control programs for controlling the action of the mobile electronic apparatus 1, specifically, for controlling the respective constituent elements of the mobile electronic apparatus 1 such as the wireless communication unit 20 and the display 41. The CPU 101 and the DSP 102 can execute various programs in the storage 103 to achieve various functions of the controller 10. Although FIG. 3 illustrates one CPU 101 and one DSP 102, the controller 10 may include CPUs 101 and DSPs 102. The CPU 101 and the DSP 102 may cooperate with each other to achieve the various functions. Although the storage 103 is inside the controller 10 in FIG. 3, it may be placed outside of the controller 10. In other words, the storage 103 may be separated from the controller 10. Some or a whole of the functions of the controller 10 may be achieved by hardware.

The controller 10 includes at least one processor for providing control and processing capability to perform various functions as described in further detail below. In accordance with various embodiments, the at least one processor 100 may be implemented as a single integrated circuit (IC) or as multiple communicatively coupled IC's and/or discrete circuits. It is appreciated that the at least one processor 100 can be implemented in accordance with various known technologies.

In one embodiment, the processor includes one or more circuits or units configurable to perform one or more data computing procedures or processes by executing instructions stored in an associated memory, for example. In other embodiments, the processor 100 may be implemented as firmware (e.g. discrete logic components) configured to perform one or more data computing procedures or processes.

The wireless communication unit 20 includes an antenna 21. In the wireless communication unit 20, the antenna 21 can receive through, for example, a base station a signal from another mobile electronic apparatus or a communication apparatus such as a web server connected to the Internet. The wireless communication unit 20 can amplify and down-convert a received signal, and output a resulting signal to the controller 10. The controller 10 can, for example, demodulate the received signal. Furthermore, the wireless communication unit 20 can up-convert and amplify a transmission signal generated by the controller 10 and wirelessly transmit the processed transmission signal through the antenna 21. The other mobile electronic apparatus or the communication apparatus connected to the Internet receives the transmission signal from the antenna 21 through, for example, the base station.

The display 41 is, for example, a liquid crystal display panel or an organic electro luminescent (EL) panel. The display 41 can receive, for example, a display signal indicating a display screen from the controller 10 and display the display signal. Specifically, the display 41 displays various pieces of information such as characters, symbols, figures, and images by control of the controller 10. The information displayed on the display 41 is displayed in the display area 2a on the front surface of the cover panel 2. Thus, the display 41 displays information in the display area 2a.

The touch panel 52 can detect an operation of an operator, such as the finger, in the display area 2a of the cover panel 2. The touch panel 52 is, for example, a projected capacitive touch detector, and is stuck on the rear surface of the cover panel 2. When the user operates the display area 2a of the cover panel 2 using an operator such as the finger, the touch panel 52 can enter the corresponding signal into the controller 10. The controller 10 can identify the content of the operation performed on the display area 2a, based on the signal from the touch panel 52, and performs a process corresponding to the identified content. The touch panel 52 may be a pressure-sensitive touch panel.

The touch panel 52 can detect a user's operation on the display screen displayed by the display 41, and accordingly, the touch panel 52 and the display 41 may cooperate with each other to comprise an input unit. The touch panel 52 and the display 41 may be integrally formed. For example, a set of the touch panel 52 and the display 41 is formed by incorporating a touch sensor into each display element of a display panel. Examples implementing such a configuration include an in-cell display and an on-cell display. Irrespective of whether the touch panel 52 and the display 41 are integrated or separated, the set of these can be called a display with a touch sensor.

The key operation unit 54 can detect an operation of depressing the operation key 5 by the user. The key operation unit 54 detects whether the operation key 5 is depressed. When the operation key 5 is not depressed, the key operation unit 54 outputs, to the controller 10, a non-operation signal indicating that the operation key 5 is not operated. When the operation key 5 is depressed, the key operation unit 54 outputs, to the controller 10, an operation signal indicating that the operation key 5 is operated. The controller 10 can accordingly determine whether the operation key 5 is operated.

The touch panel 52 and the operation key 5 function as an input unit 50 to the mobile electronic apparatus 1. Any input using the touch panel 52, which will be described below, can be assigned to the operation key 5.

In various embodiments, the input unit 50 may be implemented using any input technology or device known in the art such as, for example, a QWERTY keyboard, a pointing device (e.g., a mouse), a joy stick, a stylus, a touch screen display panel, a key pad, one or more buttons, etc., or any combination of these technologies.

The first sound output unit (for example, the receiver) 42 can output received sound, and is, for example, a dynamic speaker. The receiver 42 can convert an electric sound signal from the controller 10 into a sound, and then output the sound. The receiver 42 can output, to the outside, the sound through a receiver hole 80a located on the front surface of the mobile electronic apparatus 1. The volume of the sound output from the receiver hole 80a is lower than the volume of the sound output from the second sound output unit 44 through speaker holes 34a.

The receiver 42 may be replaced with a piezoelectric vibrator. The piezoelectric vibrator is controlled by the controller 10, and vibrates based on a sound signal. The piezoelectric vibrator is located, for example, on the rear surface of the cover panel 2, and vibrates the cover panel 2 by the own vibration based on the sound signal. The vibration of the cover panel 2 is accordingly transmitted to the user's ear as a voice. In this case, the receiver hole 80a is not required.

The second sound output unit (for example, a speaker) 44 is, for example, a dynamic speaker, and can convert an electric sound signal from the controller 10 into a sound and then output the sound. The second sound output unit 44 can output, to the outside, the sound through the speaker holes 34a located on the rear surface of the mobile electronic apparatus 1. The volume of the sound output from the speaker holes 34a is adjusted to be heard at a location distant from the mobile electronic apparatus 1. In other words, the volume of the second sound output unit (speaker) 44 is higher than that of the first sound output unit (receiver 42 or piezoelectric vibrator).

The voice input unit 46 is, for example, a microphone, and can convert the voice from the outside of the mobile electronic apparatus 1 into an electric sound signal and output the electric sound signal to the controller 10. The microphone 46 can receive the sound from the outside of the mobile electronic apparatus 1 into the mobile electronic apparatus 1 through a microphone hole located on the front surface of the cover panel 2.

The image sensor 60 includes, for example, a first image sensor 62 and a second image sensor 64. The first image sensor 62 includes, for example, an imaging lens 6a and an image sensor, and can capture a still image and a moving image based on the control by the controller 10. The imaging lens 6a, which is located on the front surface of the mobile electronic apparatus 1 as illustrated in FIG. 1, can image an object in front of the mobile electronic apparatus 1 (toward the cover panel 2).

The second image sensor 64 includes, for example, an imaging lens 7a and an image sensor and can capture a still image and a moving image based on the control by the controller 10. The imaging lens 7a, which is located on the rear surface of the mobile electronic apparatus 1 as illustrated in FIG. 2, can image an object behind the mobile electronic apparatus 1.

The movement detector 80 can detect that a user is moving. For example, the movement detector 80 includes an acceleration sensor. The acceleration sensor can detect an acceleration generated in the mobile electronic apparatus 1. For example, the acceleration sensor detects accelerations in three orthogonal directions. The mobile electronic apparatus 1 experiences an inertial force generated as the user moves, and thus, the movement detector 80 can detect that the user is moving based on time-series data on acceleration. The movement detector 80 records in advance the time-series data on typical acceleration in user's movement while walking, running, or travelling by vehicle, for example, by bicycle. The movement detector 80 can compare the stored time-series data and the detected time-series data to calculate a degree of similarity therebetween. The degree of similarity can be calculated by an appropriate technique and, for example, is calculated by calculating differences of values between pieces of time-series data and determining the total sum of absolute values of the differences. The degree of similarity becomes higher with a smaller sum. The movement detector 80 can determine that the user is moving if the degree of similarity is higher than a movement reference value. The movement reference value may be preset and stored in the storage (for example, the storage 103).

Alternatively, the movement detector 80 may include a current position detector. The current position detector can detect a current position of the mobile electronic apparatus 1. For example, the current position detector may use a global positioning system (GPS) to detect a current position. In the GPS, the current position detector receives signals from artificial satellites and calculates the current position of the mobile electronic apparatus 1 based on these signals. The movement detector 80 may detect a user's movement based on temporal changes in the current position. For example, when the movement amount of the current position in a predetermined period of time is greater than a predetermined value, the movement detector 80 may determine that the user is moving. The predetermined value may be preset and stored in the storage (for example, the storage 103).

The proximity detector 82 can detect the proximity of an object, for example, detect the proximity of an object in front of the mobile electronic apparatus 1. The proximity detector 82 may be a capacitive, inductive, ultrasonic, or infrared proximity sensor.

For example, in having a call, the user holds the mobile electronic apparatus 1 in a position of holding the receiver hole 80a to the ear as well as bringing the microphone hole (not shown) close to the mouth (hereinafter, this position is also referred to as a call position). In this case, the proximity detector 82 detects the proximity of an object (user). In the case in which the first sound output unit 42 is a piezoelectric vibrator, the mobile electronic apparatus 1 may include no receiver hole 80a. Also in this case, however, the user assumes the call position while holding the front upper portion of the mobile electronic apparatus 1 to the ear. Also in this case, accordingly, the proximity detector 82 detects the proximity of an object (user).

Controller

Figure 4:
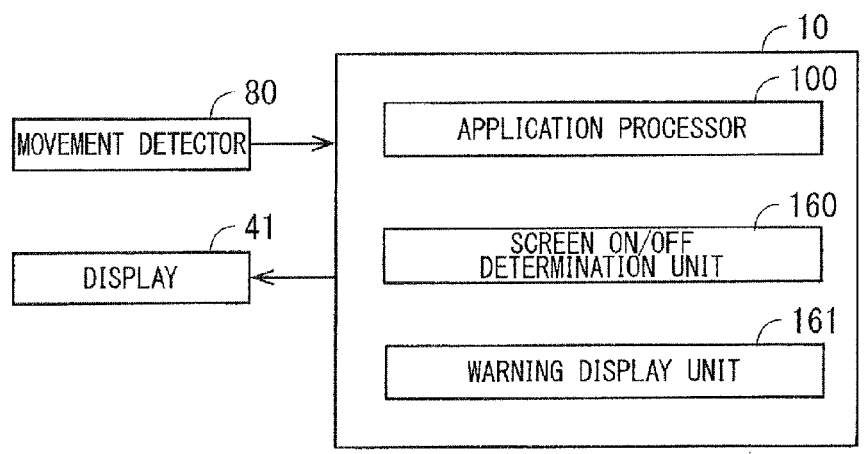
FIG. 4 schematically illustrates an example configuration of a controller.

FIG. 4 schematically illustrates an example configuration of the controller 10. The controller 10 includes an application processor 100, a screen on/off determination unit 160, and a warning display unit 161.

The application processor 100 can read and execute, for example, applications stored in the storage 103 to provide various functions of the mobile electronic apparatus 1. For example, the application processor 100 can provide a call function, a web browser function, an email function, or any other function.

The screen on/off determination unit 160 can determine whether the display 41 is showing a display. For example, the screen on/off determination unit 160 may make this determination based on whether the controller 10 has transmitted a display signal to the display 41. In the case where the display 41 is a liquid crystal display panel, the screen on/off determination unit 160 may make this determination by, for example, detecting turn-on and turn-off of a backlight.

While the display 41 is showing a display, the user is using the mobile electronic apparatus 1, and accordingly, the user's line of sight is conceivably directed to the display 41. Thus, when the movement detector 80 detects a user's movement and when the display 41 is showing a display, the warning display unit 161 displays a warning on the display 41. Specifically, when the user uses the mobile electronic apparatus 1 while moving, the warning display unit 161 displays a warning. This warning is issued to inform the user that the use of the mobile electronic apparatus 1 while moving is dangerous or to urge the user to stop the use.

Figure 5:
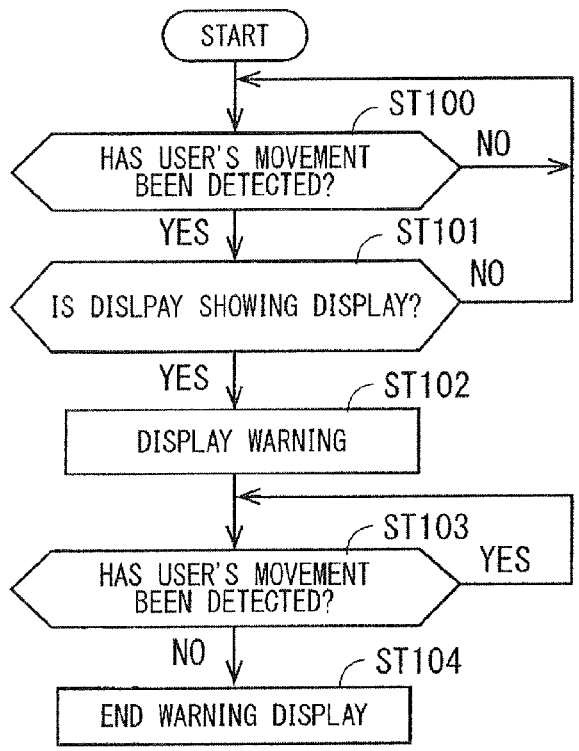
FIG. 5 illustrates a flowchart showing an example of a specific action of the mobile electronic apparatus.

FIG. 5 illustrates a flowchart showing an example of a specific action of the warning display unit 161. In step ST100, the warning display unit 161 determines whether the movement detector 80 has detected a user's movement. This is determined by the warning display unit 161 receiving a detection result from the movement detector 80. If the warning display unit 161 detects no user's movement, step ST100 is performed again. If detecting a user's movement, in step ST101, the warning display unit 161 determines whether the display 41 is showing a display. This is determined by the warning display unit 161 receiving a determination result of the screen on/off determination unit 160.

If the warning display unit 161 determines that the display 41 is showing no display, step ST100 is performed again. If determining that the display 41 is showing a display, in step ST102, the warning display unit 161 displays a warning on the display 41. For example, the background of a warning display area, which is disposed on the display 41, is made semitransparent, and a text or a graphic symbol for warning is displayed in the area.

Figure 6:
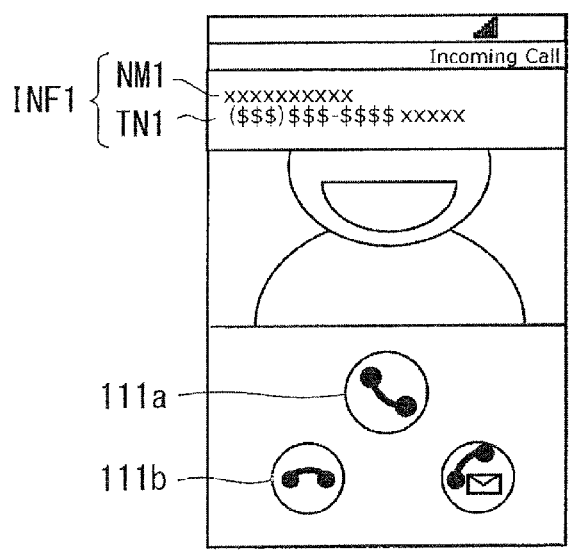
FIG. 6 schematically illustrates an example of a display screen.
Figure 7:
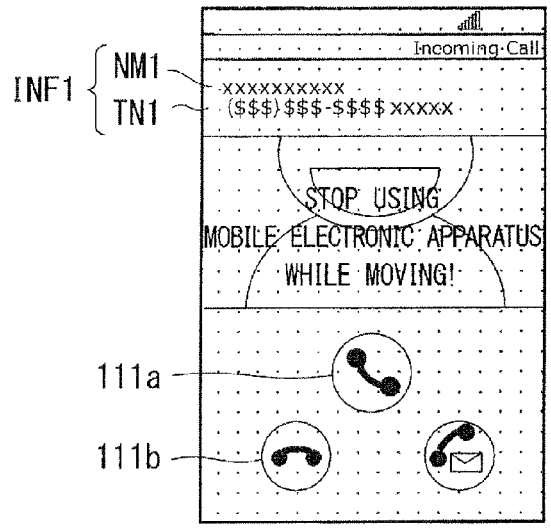
FIG. 7 schematically illustrates another example of the display screen.

FIG. 6 schematically illustrates an example of the display screen in the case in which no warning is displayed, and FIG. 7 schematically illustrates an example of the display screen in the case in which a warning is displayed. In the illustration of FIG. 7, the warning display area coincides with the entire display screen. In the illustration of FIG. 7, the semitransparent background is indicated by a sanded pattern. In the illustration of FIG. 7, "STOP USING MOBILE ELECTRONIC APPARATUS WHILE MOVING!" is displayed as a text for warning.

Then, in step ST103, the warning display unit 161 determines whether the movement detector 80 has detected a user's movement. If the movement detector 80 has detected a user's movement, step ST103 is performed again. If the movement detector 80 has not detected a user's movement, in step ST104, the warning display unit 161 ends the display of a warning.

Steps ST100 and ST101 may be performed in a reverse order.

Second Embodiment

Figure 8:
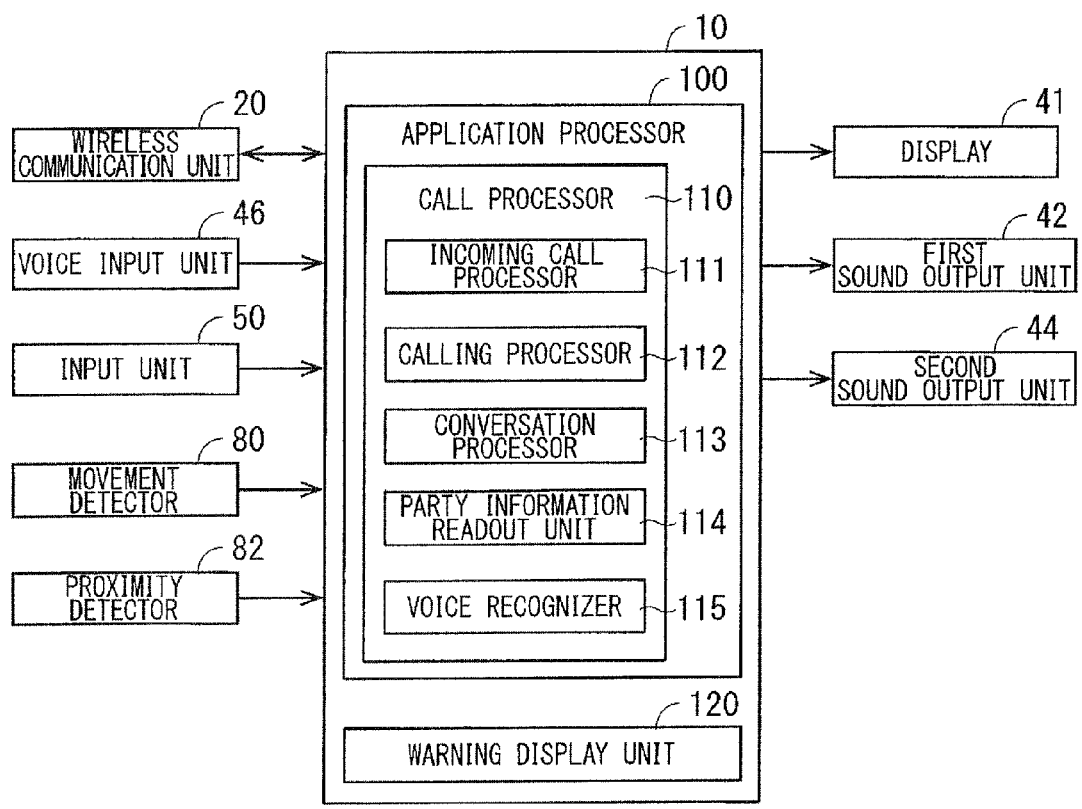
FIG. 8 schematically illustrates an example configuration of a controller.

An example of an electrical configuration of a mobile electronic apparatus 1 according to a second embodiment is as illustrated in FIG. 3. FIG. 8 illustrates a functional block diagram schematically showing an example of an internal configuration of the controller 10. The controller 10 includes the application processor 100 and the warning display unit 120, and the application processor 100 includes a call processor 110. The call processor 110 includes an incoming call processor 111, a calling processor 112, a conversation processor 113, a party information readout unit 114, and a voice recognizer 115. These functional units may be implemented as software, or the whole or some of them may be implemented as hardware.

When receiving an incoming call signal from a calling party through the wireless communication unit 20, the incoming call processor 111 can notify a user of the incoming call. For example, the incoming call processor 111 outputs a sound signal corresponding to a predetermined ringtone to the second sound output unit 44, and the second sound output unit 44 converts the sound signal into a sound and outputs the sound.

When receiving an incoming call signal, the incoming call processor 111 can display an incoming call screen on the display 41. An example of the incoming call screen is as illustrated in FIG. 6. Information INF1 on the calling party is displayed on the incoming call screen. The information INF1 on the calling party may be the information that enables the identification of a calling party, and is, for example, an identification number for call assigned to each mobile electronic apparatus 1, such as a telephone number. In the illustration of FIG. 6, the identification number of the calling party is indicated by a symbol TN1. The identification number is included in an incoming call signal. The incoming call processor 111 recognizes the identification number of the calling party based on the incoming call signal and displays the identification number on the display 41.

A name may be displayed as the information INF1 on the calling party. For example, the storage (for example, the storage 103) stores telephone directory information. The telephone directory information includes a plurality of identification numbers and the names of users corresponding to the identification numbers. The incoming call processor 111 recognizes the identification number included in the incoming call signal and identifies a calling party's name based on the identification number and the telephone directory information. Subsequently, the display 41 displays the name. In the illustration of FIG. 6, a calling party's name is indicated by a symbol NM1.

On the incoming call screen illustrated in FIG. 6 are displayed an element 111a and an element 111b that respectively function as a button for accepting an incoming call and a button for rejecting an incoming call. When the user operates the element 111a or the element 111b, the touch panel 52 detects this operation and outputs it to the incoming call processor 111. Such an operation may be an operation of bringing, for example, an operator proximate to the element and then moving the operator away from the element ("tapping"). The "proximity" herein includes a state in which the operator or the like is close to the display area 2a, as well as a state in which the operator or the like is in contact with the display area 2a. The incoming call processor 111 starts a call in response to an operation on the element 111a or interrupts the communication with the calling party in response to an operation on the element 111b.

The calling processor 112 can transmit a calling signal to the calling party through the wireless communication unit 20 in response to a user's input. For example, the calling processor 112 displays a calling screen (not shown) on the display 41. On the calling screen are displayed, for example, an element that functions as a button for entering an identification number and an element that functions as a button for instructing calling. When the user enters the identification number and instructs calling with these elements, such operations are detected by the touch panel 52 and are output to the calling processor 112. The calling processor 112 transmits, in response to the operation, a calling signal to the calling party with the assigned identification number. The calling processor 112 starts a call when receiving an acceptance from the calling party or interrupts the communication with the calling party when receiving a rejection from the calling party.

The conversation processor 113 can output a sound signal received from the calling party from, for example, the first sound output unit 42 and transmit a sound signal received from the voice input unit 46 to the calling party, during a call. The user accordingly talks with the calling party.

The conversation processor 113 may display a call screen (not shown) on the display 41. An element that functions as a button for ending a call may be displayed on the call screen. When the user operates the element, the operation is detected by the touch panel 52 and is output to the conversation processor 113. The conversation processor 113 ends a call in response to the operation.

When the movement detector 80 detects a user's movement and the proximity detector 82 detects the proximity of an object with an incoming call signal received (that is, during the receipt of an incoming call signal), the party information readout unit 114 can read out the information on the calling party through the first sound output unit 42. Specifically, when the user receives an incoming call signal while moving and assumes the call position, the user can listen to the information on the calling party from the first sound output unit 42.

The information on a calling party may be the information that enables identification of a calling party, which may be, for example, an identification number for call such as a telephone number. In this case, the party information readout unit 114 generates a sound signal corresponding to how to read the identification number. A sound signal can be generated using an algorithm for any speech synthesis such as a waveform concatenation speech synthesis or a formant synthesis. The party information readout unit 114 then outputs the sound signal to the first sound output unit 42. The first sound output unit 42 outputs this sound signal as a voice, so that an identification number is read out.

The information on a calling party may be a name. For example, the storage 103 stores telephone directory information. The telephone directory information includes an identification number and a user's name corresponding to the identification number, as well as how to read the name. The party information readout unit 114 identifies how to read the calling party's name based on the identification number included in the incoming call signal and the telephone directory information stored in the storage 103. The party information readout unit 114 then generates a sound signal corresponding to how to read the name and outputs the sound signal to the first sound output unit 42. The first sound output unit 42 outputs the sound signal as a voice, so that the calling party's name is read out.

The voice recognizer 115 receives a sound signal from the voice input unit 46. Specifically, the voice recognizer 115 receives the sound from the user through the voice input unit 46. The voice recognizer 115 can recognize a word indicated by the input sound signal. The voice recognition method may be any method. For example, through matching between a sound signal and voice characteristic data on the voice stored in the storage (for example, the storage 103) in advance, a word of the voice indicated by the sound signal may be recognized.

The voice recognizer 115 can determine whether a voice equivalent to a response (an acceptance or a rejection) to an incoming call has been entered. For example, the word equivalent to an acceptance and the word equivalent to a rejection are predetermined and may be stored in the storage (for example, storage 103). The voice recognizer 115 determines whether the sound signal entered from the voice input unit 46 includes the word corresponding to an acceptance or a rejection. The voice recognizer 115 notifies the incoming call processor 111 that a voice for acceptance has been entered if the sound signal includes the word corresponding to an acceptance or notifies the incoming call processor 111 that a voice for rejection has been entered if the sound signal includes the word corresponding to a rejection.

The incoming call processor 111 starts a call when a voice for acceptance is entered and ends the communication with the calling party when a voice for rejection is entered. The user can accordingly perform an input in response to an incoming call by voice input.

The warning display unit 120 can display a warning on the display 41 when a user's movement is detected during the receipt of an incoming call signal. For example, the warning display unit 120 displays a warning as illustrated in FIG. 7.

Figure 9:
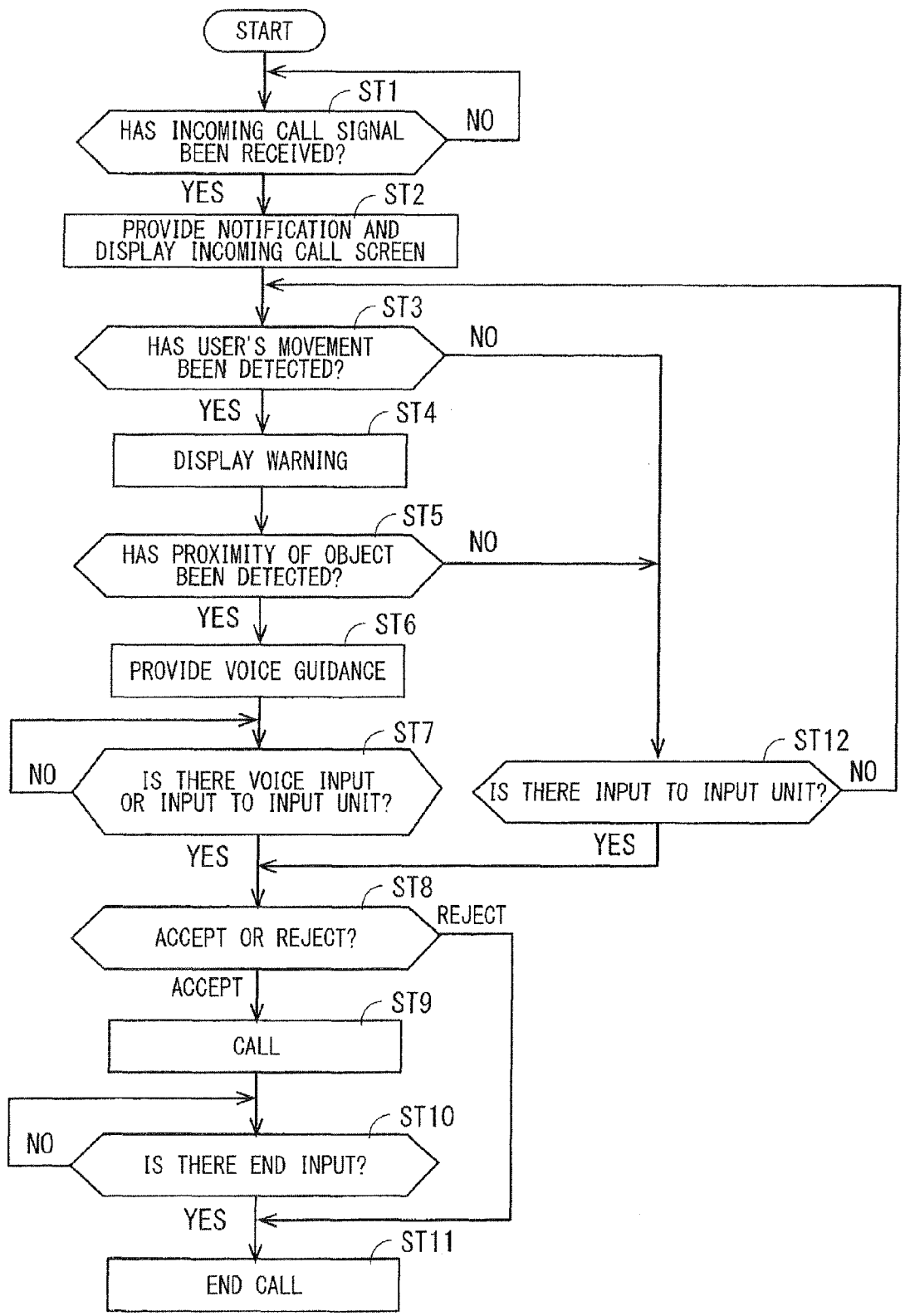
FIG. 9 illustrates a flowchart showing an example of a specific action of the mobile electronic apparatus.

FIG. 9 illustrates a flowchart showing an example of a specific action of the call processor 110. In step ST1, first, the incoming call processor 111 determines whether it has received an incoming call signal through the wireless communication unit 20. If the incoming call processor 111 determines that it has not received an incoming call signal, step ST1 is performed again. If determining that it has received an incoming call signal, in step ST2, the incoming call processor 111 notifies the user of an incoming call and displays the incoming call screen on the display 41. In step ST3, next, the party information readout unit 114 determines whether the movement detector 80 has detected a user's movement. This is determined by the party information readout unit 114 receiving a detection result from the movement detector 80.

If determining that the movement detector 80 has detected a user's movement, in step ST4, the warning display unit 120 displays a warning on the display 41 (for example, see FIG. 7).

In step ST5, next, the party information readout unit 114 determines whether the proximity detector 82 has detected the proximity of an object. This is determined by the party information readout unit 114 receiving a detection result from the proximity detector 82.

If determining that it has detected the proximity of an object, in step ST6, the party information readout unit 114 outputs the information on the calling party as a voice through, for example, the first sound output unit 42. When it is determined that it has detected the proximity of an object, the incoming call processor 111 may display nothing on the display 41. This avoids operating errors of the display 41, and furthermore, the touch panel 52. Non-display of the display 41, which responds to the proximity of an object, is also applicable to the other cases described below, and will not be described repetitively.

In step ST7, next, the incoming call processor 111 determines whether the user has entered a voice for acceptance or rejection, or the input unit 50 has received an input for acceptance or rejection. The presence or absence of a voice input can be determined from the notification by the voice recognizer 115 as described above. When determining that the user has entered a voice or the input unit 50 has received an input, in step ST8, the incoming call processor 111 determines whether an acceptance has been entered or a rejection has been entered. If determining that a rejection has been entered, in step ST11, the incoming call processor 111 interrupts the communication with the calling party.

If determining that an acceptance has been entered, in step ST9, the incoming call processor 111 starts a call. Specifically, the conversation processor 113 outputs a sound signal from the calling party from, for example, the first sound output unit 42 as described above and transmits a sound signal from the voice input unit 46 to the calling party. The user accordingly talks with the calling party.

In step ST10, next, the conversation processor 113 determines whether a call end has been entered. The user can enter a call end using, for example, the input unit 50. For example, the user can operate an element for ending a call, which is located on the call screen (not shown), to perform the input. If the conversation processor 113 determines that the user has not entered a call end, step ST10 is performed again. If determining that the user has entered a call end, the conversation processor 113 ends a call in step ST11.

In such an action, according to steps ST3 to ST6, if receiving an incoming call while moving, the user can hold the receiver hole 80*a* of the mobile electronic apparatus 1 to the ear to catch the information on the calling party. The reason for the above is as follows. Since the user is moving, an affirmative determination is made in step ST3. When the user holds the receiver hole 80*a* of the mobile electronic apparatus 1 to the ear, an affirmative determination is also made in step ST5. In step ST6, accordingly, the party information readout unit 114 outputs the information on the calling party as a voice through the first sound output unit 42. The user can thus catch the information on the calling party.

The user does not need to look at the mobile electronic apparatus 1 to catch the information on the calling party as described above. The user can thus obtain the information on the calling party while restricting the user's line of sight from being focused on the mobile electronic apparatus 1. In other words, the user can check the information on the calling party with the ear while checking the surroundings with the eyes.

In the illustration of FIG. 9, further, an input can be performed in response to an incoming call by voice input (steps ST7 to ST9). The user does not need to look at the mobile electronic apparatus 1 to perform such a voice input. The user can thus perform an input in response to an incoming call while seeing the surroundings.

When a warning is displayed at the occurrence of an incoming call, the user cannot readily look at the incoming call screen (for example, see FIG. 7). If the identification of a calling party by voice is not valid and/or a voice input to be performed in response to an incoming call is not valid as in the first embodiment, the user may look at the incoming call screen more carefully. Alternatively, the user may perform an input for ending a warning display (which will be described below) and then identify the calling party on the incoming call screen, thus performing an input in response to an incoming call. In the illustration of FIG. 9, although a warning is displayed (step ST4), by voice, a calling party can be identified and/or input can be performed in response to an incoming call. Thus, the user does not necessarily need to look at this warning and perform an input for ending a warning display. The user can thus identify a calling party and perform an input in response to an incoming call with safety and a high degree of convenience.

The user does not need to look at the mobile electronic apparatus 1 in the second embodiment, and thus, can identify a calling party and/or perform an input in response to an incoming call while seeing the surroundings with a wide visibility.

In the illustration of FIG. 9, if the movement detector 80 does not detect a user's movement in step ST3 or if the proximity detector 82 does not detect the proximity of an object in step ST5, in step ST12, the incoming call processor 111 determines whether an acceptance or rejection has been entered to the input unit 50. If there is no such an input, step ST3 is performed again. If there is such an input, step ST8 is performed.

According to steps ST3 and ST12 above, while not moving, the user can enter an acceptance or a rejection to the input unit 50 while identifying a calling party on the incoming call screen. Specifically, the user may look at the mobile electronic apparatus 1 while not moving, and thus, is allowed to identify a calling party and enter an acceptance or a rejection to the input unit 50 on the display 41.

In the illustration of FIG. 9, also while moving, the user is allowed to identify a calling party and enter an acceptance or a rejection to the input unit 50 on the display 41 (steps ST3, ST5, and ST12). This is the process reflecting a case in which the user can turn the user's line of sight to the mobile electronic apparatus 1 while moving. For example, when there is neither a person around the user nor an object into which the user runs, the user may look at the mobile electronic apparatus 1 even while moving. It suffices that the user determines such a situation by himself/herself.

In the illustration of FIG. 9, also when identifying a calling party by readout (step ST6), the user can enter an acceptance or a rejection to the input unit 50 (step ST7). In other words, the user can identify a calling party by voice and perform an input with the input unit 50.

As described above, in the illustration of FIG. 9, the user can identify a calling party and perform an input in response to an incoming call while moving by various methods.

Specifically, the user can identify a calling party by looking at the display 41 or by holding the receiver hole 80*a* to the ear. The user can also enter a response to an incoming call by an input to the input unit 50 or by a voice input. This results in a high degree of convenience.

While moving, thus, the user may identify a calling party only by voice. In other words, the user may not be required to identify a calling party by looking at the display 41 when receiving an incoming call while moving. For example, when a user's movement is detected while receiving an incoming call signal, the incoming call processor 111 may not display the information INF1 on the calling party on the display 41 in the incoming call screen. The user accordingly cannot identify a calling party even by turning the user's line of sight to the display 41 when receiving an incoming call while moving, so the necessity for the user to turn the user's line of sight to the display 41 is small. The user can thus restrict the line of sight from being focused on the display 41 when receiving an incoming call while moving.

When receiving an incoming call while moving, the user may be prohibited from entering an acceptance or a rejection to the input unit 50. When a user's movement is detected during the receipt of an incoming call signal, for example, the incoming call processor 111 may not need to display the elements 111*a* and 111*b* that function as a button for acceptance and a button for rejection, respectively, on the incoming call screen. The user accordingly cannot check the elements 111*a* and 111*b* even by turning the user's line of sight to the display 41 when receiving an incoming call while moving. Thus, the user can restrict the user's line of sight from being focused on the display 41 when receiving an incoming call while moving.

The incoming call processor 111 may not need to display the incoming call screen when a user's movement is detected during the receipt of an incoming call signal. Thus, the information INF1 on a calling party and the elements 111*a* and 111*b* are not displayed.

Detection of Movement

If a user's movement is detected even once during the receipt of an incoming call signal, the information on a calling party may be read out when the proximity of an object is detected. This is the process reflecting that the user pauses and then moves again. Specifically, even when the user discontinues moving during the receipt of an incoming call signal, the calling party is read out in response to the proximity of an object during the receipt of the incoming call signal.

Figure 10:
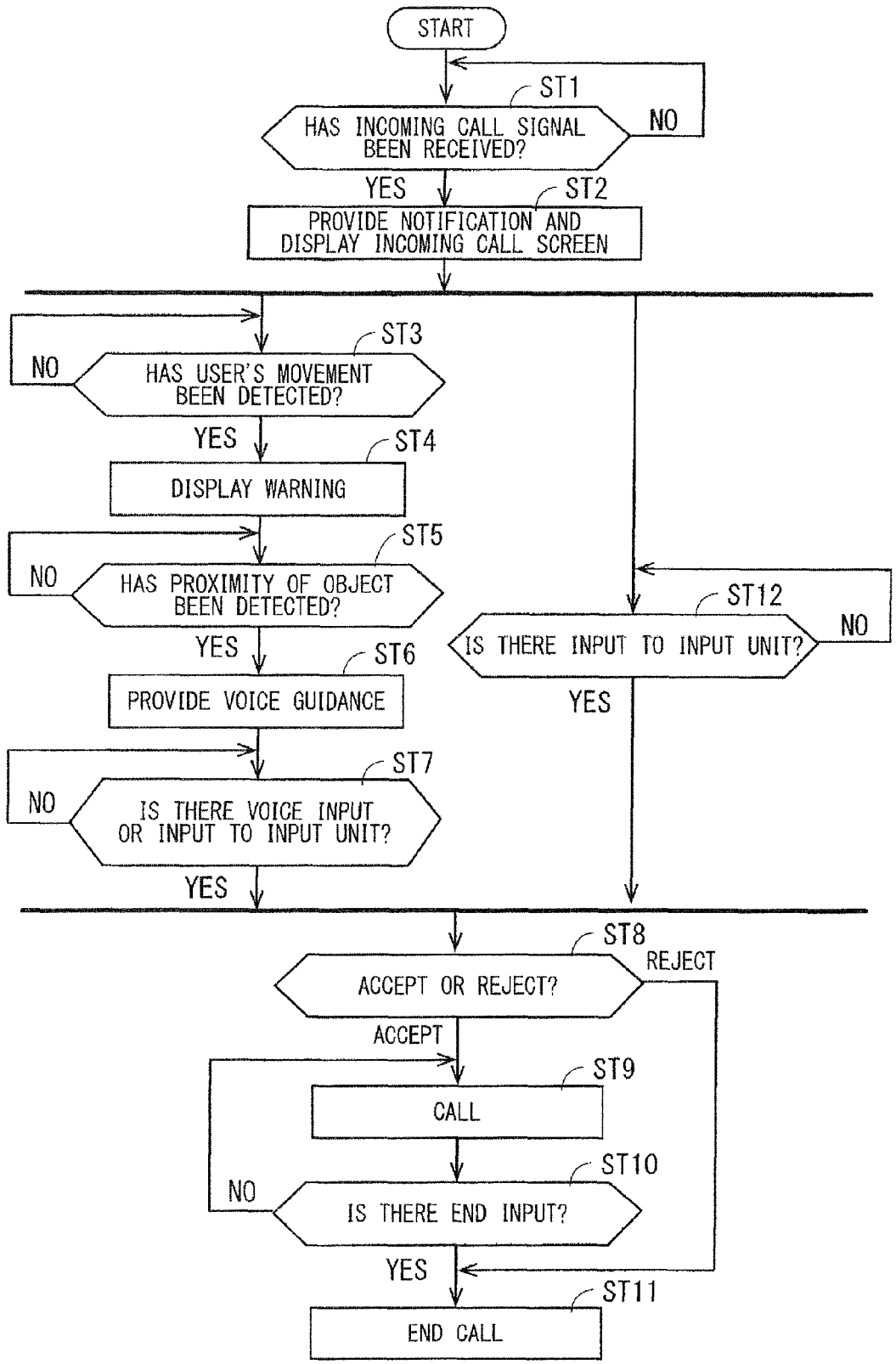
FIG. 10 illustrates a flowchart showing an example of a specific action of the mobile electronic apparatus.

FIG. 10 illustrates a flowchart showing an example of a specific action of the call processor 110. With respect to FIG. 9, the call processor 110 simultaneously performs step ST12 and a set of steps ST3 to ST7. The call processor 110 simultaneously performs these steps through, for example, time division. If a determination is negative in step ST3, step ST3 is performed again. If a determination is negative in step ST5, step ST5 is performed again.

If a user's movement is detected in step ST3, accordingly, even when a user's movement is not detected at step ST5, the information on a calling party is read out in response to the proximity of an object (step ST6). If a user's movement is detected even once during the receipt of an incoming call signal, thus, the information on the calling party is read out by the user assuming the call position during the receipt of an incoming call signal. As a result, even during a pause, the user can assume the call position to identify a calling party while checking the surroundings. Thus, the user can readily determine whether to restart moving.

If a user's movement is not detected even once during the receipt of an incoming call signal, even when the proximity of an object is detected, a calling party may not need to be read out. This is because, while not moving, the user may identify a calling party by looking at the display 41. This avoids an unnecessary process by the party information readout unit 114, thus avoiding unnecessary consumption power. For example, with reference to FIGS. 9 and 10, the calling party is not read out if a user's movement is not detected.

End of Warning Display

The user cannot readily look at the incoming call screen (for example, see FIG. 7) during warning display, and thus, the warning display may be ended in response to a user's input to the input unit 50. For example, the user performs an operation of moving an operator upward while bringing the operator proximate to the display 41 ("slide operation"). This operation is detected by the touch panel 52 and is output to the warning display unit 120. The warning display unit 120 ends the warning display in response to the operation. As a result of the end of this waring display, the user can readily look at the incoming call screen (for example, see FIG. 6) and can readily check the information INF1 on the calling party and the element 111*a* for acceptance and the element 111*b* for rejection.

In other words, the user performs an input for ending a warning display when identifying a calling party and/or performing an input in response to an incoming call on the incoming call screen. Conversely, when a warning display is ended, readout of a calling party is not necessary and/or input of a voice for an incoming call is not necessary. When an input for ending a warning display has not been performed, thus, the call processor 110 may not need to read out a calling party and/or may invalidate a voice input in response to an incoming call. Consequently, an unnecessary action of the call processor 110 is avoided, thus avoiding unnecessary power consumption.

Figure 11:
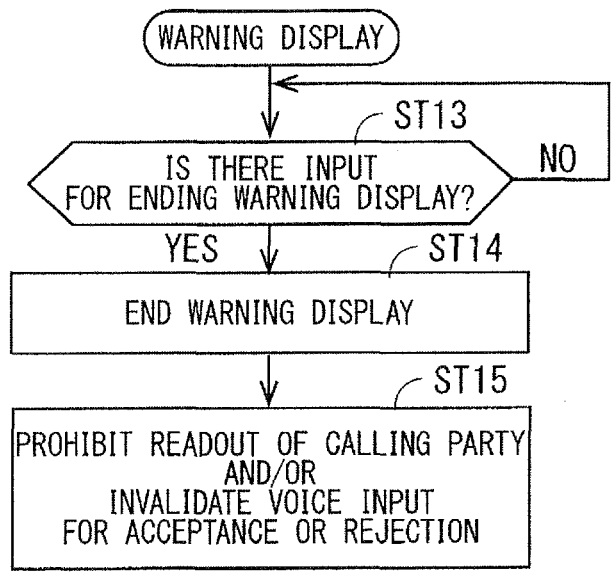
FIG. 11 illustrates a flowchart showing an example of a specific action of the mobile electronic apparatus.

FIG. 11 illustrates a flowchart showing an example of the specific action described above. In step ST13, the controller 10 determines whether the input unit 50 has received an input for ending a warning display. If the controller 10 determines that the input unit 50 has received the input, step ST13 is performed again. If the controller 10 determines that the input unit 50 has not received the input, in step ST14, the warning display unit 120 displays no warning. No-display of warning may be kept while, for example, during the receipt of the incoming call signal. Specifically, even when a user's movement is detected, the warning display unit 120 may not display a warning during the receipt of the incoming call signal. In step ST15, next, the call processor 110 prohibits readout of a calling party and/or invalidates a voice input for acceptance or rejection. The readout of a calling party may be continuously prohibited and/or the voice input for acceptance or rejection may be continuously invalidated during the receipt of the incoming call signal. Specifically, even when a user's movement is detected, while the call processor 110 is receiving a signal, readout of a calling party may be prohibited and/or a voice input for acceptance or rejection may be invalidated.

Warning Display Yet to be Performed

Although a warning is displayed on the incoming call screen when the user receives an incoming call signal while moving in the example above, this warning is not always necessary. This is because also in the case above, by assuming the call position when receiving an incoming call while moving, the user can catch the information on a calling party while restricting the user's line of sight from being focused on the mobile electronic apparatus 1. In this case, the controller 10 may include no warning display unit 120.

Input of Call End

In the description given with reference to FIGS. 9 and 10 above, during a call, an end input for ending the call (step ST10) is perfo ied to the input unit 50. For example, the user operates an element for end input in the call screen (not shown) displayed on the display 41 to perform an end input. To operate the element, accordingly, the user often looks at the display 41 to check the position of the element. Thus, it is not preferable that the user turn the user's line of sight to the display 41 while moving as described above.

Figure 12:
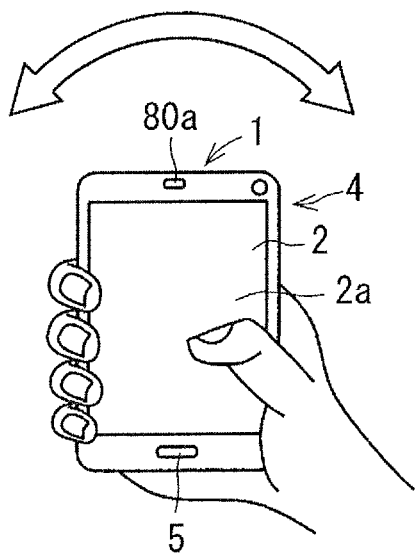
FIG. 12 illustrates a view for explaining a shake end input.

During a call involving a user's movement, thus, the user may perform an end input based on the acceleration generated in the mobile electronic apparatus 1. Specifically, the user spatially moves the mobile electronic apparatus 1 to generate an acceleration in the mobile electronic apparatus 1, thus performing an end input. For example, as illustrated in FIG. 12, the user shakes the mobile electronic apparatus 1 along the transverse direction thereof to perform an end input. The block arrow of FIG. 12 schematically indicates an example of the motion. Hereinafter, an end input performed by spatially moving the mobile electronic apparatus 1 is also referred to as a shake end input.

Figure 13:
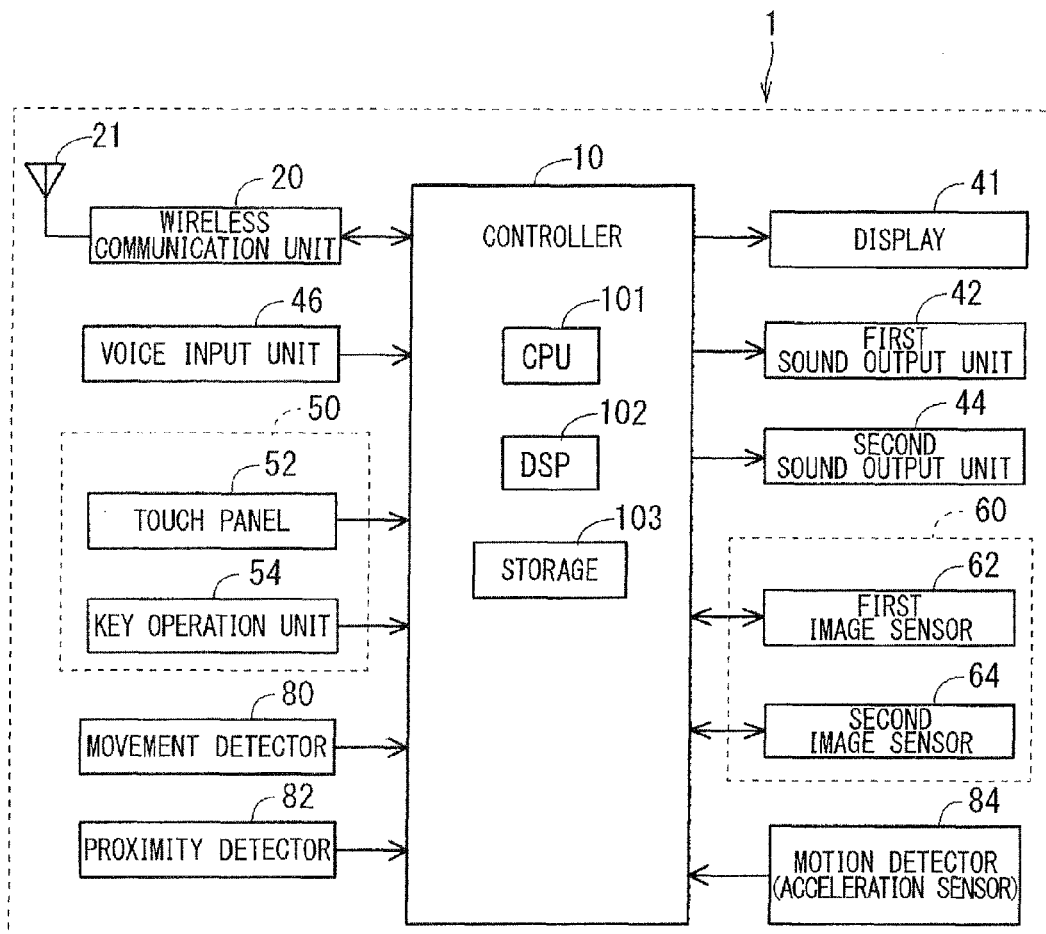
FIG. 13 schematically illustrates an example of an electrical configuration of the mobile electronic apparatus.

FIG. 13 schematically illustrates an example of an electrical configuration of the mobile electronic apparatus 1. With respect to FIG. 3, the mobile electronic apparatus 1 of FIG. 13 further includes a motion detector 84. The motion detector 84 can detect the spatial motion of the mobile electronic apparatus 1.

For example, the motion detector 84 includes an acceleration sensor. When the movement detector 80 includes an acceleration sensor, the motion detector 84 may use this acceleration sensor. The motion of the mobile electronic apparatus 1 illustrated in FIG. 12 generates a large acceleration in the transverse direction of the mobile electronic apparatus 1. The acceleration in the transverse direction detected by the acceleration sensor and an acceleration reference value are compared, and it may be determined that a shake end input has been performed if the acceleration is greater than the acceleration reference value.

Alternatively, a shake end input may be determined based on a spatial path of the mobile electronic apparatus 1. For example, when the user spatially moves the mobile electronic apparatus 1 along a predetermined path, an acceleration corresponding to the path occurs in the mobile electronic apparatus 1. Thus, the motion of the mobile electronic apparatus 1 along the path can be detected by detecting this acceleration. For example, the storage (for example, the storage 103) stores time-series data on the acceleration corresponding to the path in advance. Then, this time-series data and the time-series data on the detected acceleration are compared, to thereby calculate a degree of similarity therebetween. If the degree of similarity is higher than an end reference value, it can be determined that a shake end input has been performed. The end reference value may be, for example, preset and stored in the storage (for example, the storage 103).

Figure 14:
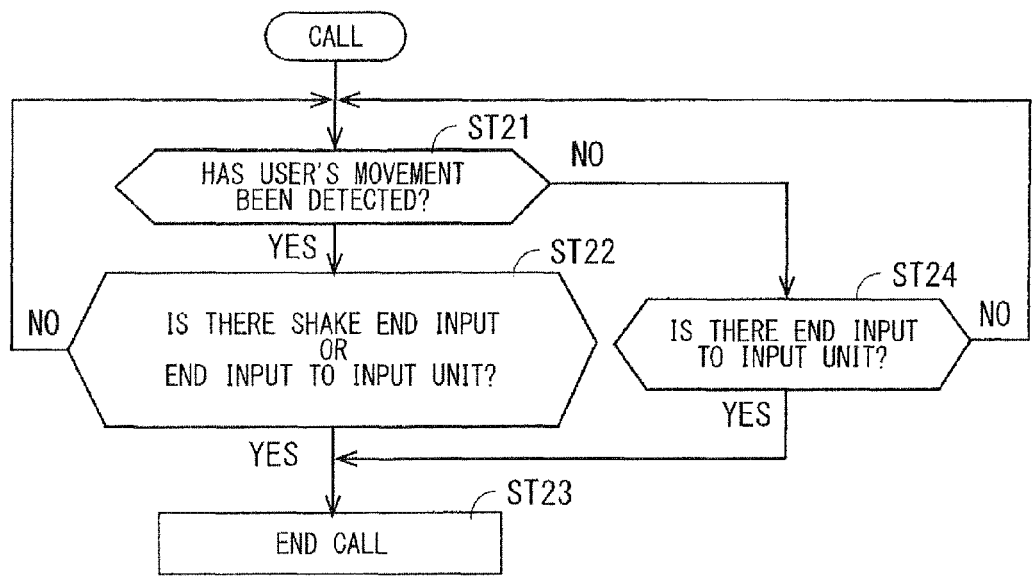
FIG. 14 illustrates a flowchart showing an example of a specific action of a call processor.

FIG. 14 illustrates a flowchart showing an example of a specific action of the call processor 110. This flowchart illustrates an example action during a call. In step ST21, the conversation processor 113 determines whether the movement detector 80 has detected a user's movement. If determining that the movement detector 80 has detected a user's movement, in step ST22, the conversation processor 113 determines whether the motion detector 84 has detected a shake end input or the input unit 50 has received an end input. If the conversation processor 113 determines that none of these end inputs have been performed, step ST21 is performed again. If the conversation processor 113 determines that any of the end inputs has been performed, in step ST23, the conversation processor 113 ends the call.

If determining that the movement detector 80 has not detected a user's movement in step ST21, in step ST23, the conversation processor 113 determines whether the input unit 50 has received an end input. If the conversation processor 113 determines that the input unit 50 has not received an end input, step ST21 is performed again. If determining that the input unit 50 has received an end input, in step ST23, the conversation processor 113 ends the call.

While moving during a call, the user can end the call by spatially moving the mobile electronic apparatus 1 as described above. The user does not need to concentrate the user's line of sight on the mobile electronic apparatus 1 to spatially move the mobile electronic apparatus 1. The user can thus end the call while seeing the surroundings.

In the illustration of FIG. 14, when a user's movement has not been detected, a shake end input is not valid (steps ST21 and ST24). Specifically, a shake end input is invalid. While the user is at rest, accordingly, the motion detector 84 does not need to determine the presence or absence of a shake end input. Unnecessary power consumption can thus be avoided.

If the movement detector 80 detects a user's movement even once during a call after the receipt of an incoming call signal, a shake end input may be validated during the call. This is because the user may possibly restart moving even after a pause, and accordingly, a shake end input is validated during a call if a user's movement is detected even once.

This may be performed, for example, as described below. For example, when the movement detector 80 detects a movement after the receipt of an incoming call signal, the storage (for example, the storage 103) stores a flag. When the user ends the call, the flag is erased from the storage. The call processor 110 validates the shake end input during a call if the flag is stored, or invalidates the shake end input during the call if the flag is not stored.

In the illustration of FIG. 14, even if the movement detector 80 detects a user's movement, an end input to the input unit 50 is validated (step ST22). This is the process reflecting that the user can turn the user's line of sight to the mobile electronic apparatus 1 while moving in some cases. Needless to say, unlike the illustration of FIG. 14, when a user's movement is detected, an end input to the input unit 50 may be invalidated. The user thus does not need to look at the mobile electronic apparatus 1 for an end input and can restrict the user's line of sight from being focused on the mobile electronic apparatus 1.

Input in Response to Incoming Call

In the illustrations of FIGS. 9 and 10, the user can perform an input in response to an incoming call while moving by voice input (step ST7). The user may accordingly perform an input in response to an incoming call while moving through a spatial motion of the mobile electronic apparatus 1. Specifically, when a user's movement is detected during the receipt of an incoming call signal, the call processor 110 may receive an input performed in response to an incoming call based on a spatial motion of the mobile electronic apparatus 1. The motion detector 84 can detect such a motion.

For example, with reference to FIG. 1, the mobile electronic apparatus 1 may be spatially moved in the vertical direction of the sheet of FIG. 1 to enter an acceptance and may be spatially moved in the horizontal direction of the sheet to enter a rejection. The acceleration generated in the vertical direction of the sheet is large in the former case, and the acceleration generated in the horizontal direction of the sheet is large in the latter case. The motion detector 84 may determine that an acceptance has been entered when the acceleration generated in the vertical direction of the sheet exceeds a predetermined reference value and determine that a rejection has been entered when the acceleration generated in the horizontal direction of the sheet exceeds the predetermined reference value. In other words, the motion detector 84 may detect accelerations in different directions, or a first direction and a second direction, and determine that an acceptance has been entered when the acceleration in the first direction exceeds the reference value or determine that a rejection has been entered when the acceleration in the second direction exceeds the reference value.

The storage (for example, the storage 103) may store the information indicating a motion in the vertical direction of the sheet and the information indicating a motion in the horizontal direction of the sheet (for example, time-series data on acceleration). The motion detector 84 may compare each of these pieces of information and the time-series data on the detected accelerations to calculate a degree of similarity. When the degree of similarity exceeds a reference value, the motion detector 84 may determine that the corresponding motion has been performed.

The user does not need to focus the user's line of sight on the mobile electronic apparatus 1 in order to spatially move the mobile electronic apparatus 1. The user can thus perform, while seeing the surroundings, an input in response to an incoming call made during user's movement.

Readout of Information on Call Waiting Party

During a call, the call processor 110 may receive an incoming call signal from another mobile electronic apparatus (hereinafter referred to as a call waiting signal) through the wireless communication unit 20. When receiving the call waiting signal, the incoming call processor 111 notifies the user of the incoming call. For example, the incoming call processor 111 outputs a predetermined sound from the first sound output unit 42. The user can thus know the occurrence of a call waiting.

When receiving a call waiting signal during a call involving a user's movement, the party information readout unit 114 may read out the information on a party (hereinafter referred to as a call waiting party) that has transmitted the call waiting signal. Specifically, the party information readout unit 114 may read out the information on a call waiting party through, for example, the first sound output unit 42 when a user's movement is detected during the receipt of a call waiting signal. The information on a call waiting party may be the information for identifying a call waiting party, and may be, for example, an identification number for call (for example, a telephone number) or a calling party's name. The identification number for call is included in the call waiting signal.

Figure 15:
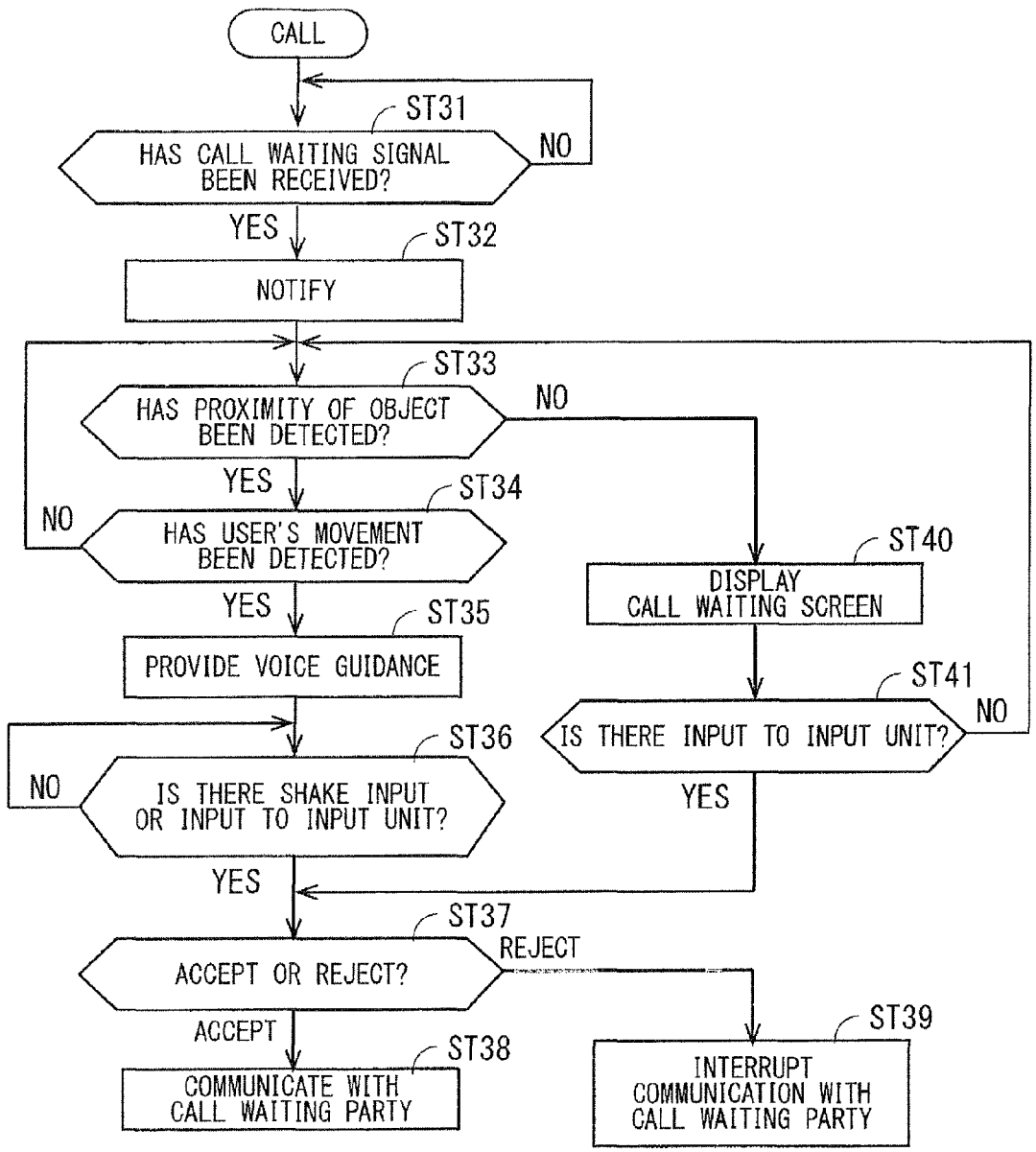
FIG. 15 illustrates a flowchart showing an example of a specific action of the call processor.

FIG. 15 illustrates a flowchart showing an example of a specific action of the mobile electronic apparatus 1. FIG. 15 illustrates an example action for a call waiting during a call. In step ST31, first, the incoming call processor 111 determines whether it has received a call waiting signal. If the incoming call processor 111 determines that it has not received a call waiting signal, step ST31 is performed again.

If determining that it has received a call waiting signal, in step ST32, the incoming call processor 111 notifies the user of the call waiting. For example, the incoming call processor 111 outputs a predetermined sound through, for example, the first sound output unit 42.

In step ST33, the incoming call processor 111 determines whether the proximity detector 82 has detected the proximity of an object. If determining that it has detected the proximity of an object, in step ST34, the incoming call processor 111 determines whether the movement detector 80 has detected a user's movement. If the incoming call processor 111 determines that the movement detector 80 has not detected a user's movement, step ST33 is performed again. If the incoming call processor 111 determines that the movement detector 80 has detected a user's movement, in step ST35, the party information readout unit 114 identifies the information on a call waiting party based on the call waiting signal and generates a sound signal for reading out the information. This sound signal is output as a voice through, for example, the first sound output unit 42.

The information on a call waiting party may be output together with the voice from the calling party. For example, a sound signal from the party information readout unit 114 and a sound signal from the conversation processor 113 may be synthesized, and a synthesized signal may be output to the first sound output unit 42. In this case, however, the voice output from the first sound output unit 42 includes the voice from the calling party and the information on the call waiting party. Thus, the user cannot readily catch the information on the call waiting party.

When reading out the information on the call waiting party, thus, an output of a sound signal from the calling party may be discontinued. For example, the party information readout unit 114 instructs the conversation processor 113 to discontinue an output of a sound signal, and then, outputs a sound signal for reading out a call waiting party to the first sound output unit 42. The conversation processor 113 discontinues outputting a sound signal to the first sound output unit 42 in response to this instruction. After completing the output of a sound signal indicating a call waiting party, the party information readout unit 114 then instructs the conversation processor 113 to restart outputting a sound signal. The conversation processor 113 restarts outputting a sound signal in response to this instruction. Thus, the voice output from the first sound output unit 42 includes either the voice from the calling party or the voice occurred when a call waiting party is read out. Thus, the user can readily listen to the information on the call waiting party.

In step ST36, next, the incoming call processor 111 determines whether an input has been performed in response to the call waiting. Herein, an input by a spatial motion of the mobile electronic apparatus 1 (hereinafter also referred to as a shake input) is also validated. Specifically, in step ST36, the incoming call processor 111 determines whether a shake input has been performed or an input using the input unit 50 has been performed. If the incoming call processor 111 determines that none of the inputs have been performed, step ST36 is performed again.

If determining that any of the inputs has been performed, in step ST37, the incoming call processor 111 determines whether an acceptance has been entered or a rejection has been entered. If determining that a rejection has been entered, in step ST39, the incoming call processor 111 interrupts the communication with the call waiting party.

If determining that an acceptance has been entered, in step ST38, the incoming call processor 111 communicates with the call waiting party. More specifically, the conversation processor 113 outputs a sound signal from the call waiting party from, for example, the first sound output unit 42 and transmits a sound signal from the voice input unit 46 to the call waiting party. The user accordingly talks with the call waiting party.

If the determination is negative in step ST33, in step ST40, the incoming call processor 111 displays a call waiting screen on the display 41. The information on the call waiting party is displayed on the call waiting screen, and also, the elements that respectively function as a button for accepting a call waiting and a button for rejecting a call waiting may be displayed on the display 41.

In step ST41, next, the incoming call processor 111 determines whether an acceptance or a rejection has been entered to the input unit 50. If the incoming call processor 111 determines that no input has been performed, step ST33 is performed again. If the incoming call processor 111 determines that an input has been performed, step ST37 is performed.

As described above, according to steps ST33 to ST35, the user can catch the information on a call waiting party from the first sound output unit 42 of the mobile electronic apparatus 1 when receiving a call waiting signal while moving. This is because an affirmative determination is made in step ST33 when the user has a call in the call position, and also, an affirmative determination is made in step ST34 when the user moves. As a result, in step ST35, the party information readout unit 114 outputs the information on the call waiting party through the first sound output unit 42. The user can accordingly catch the information on the call waiting party. Specifically, the user can obtain the information on the call waiting party while seeing the surroundings.

In the illustration of FIG. 15, moreover, the user can perform an input in response to a call waiting made during user's movement, by a shake input (steps ST36 to ST39). The user accordingly does not need to concentrate the user's line of sight on the mobile electronic apparatus 1 for this input. The user can thus perform an input in response to a call waiting while seeing the surroundings.

If a user's movement is detected even once after the receipt of a first incoming call signal, a call waiting party may be read out in response to the call waiting during a call of the user. Also when the user receives a call waiting signal during a pause, accordingly, a call waiting party can be read out. The user can thus know a call waiting party while checking the surroundings.

Similarly, if a user's movement is detected even once after the receipt of a first incoming call signal, a shake input performed in response to the call waiting during the call may be received. The user can thus perform an input in response to a call waiting while checking the surroundings even during a pause.

Guidance During Call Waiting

In the example above, the information on a call waiting party is read out when a user's movement and the proximity of an object are detected during the receipt of a call waiting signal. Alternatively, the user may be urged to stop in place of reading out the information on a call waiting party, or may be urged to stop together with readout. Specifically, the incoming call processor 111 may output a voice for urging the user to stop through, for example, the first sound output unit 42 when a user's movement is detected during the receipt of a call waiting signal. A sound signal indicating this voice may be preset and stored in the storage (for example, the storage 103).

Figure 16:
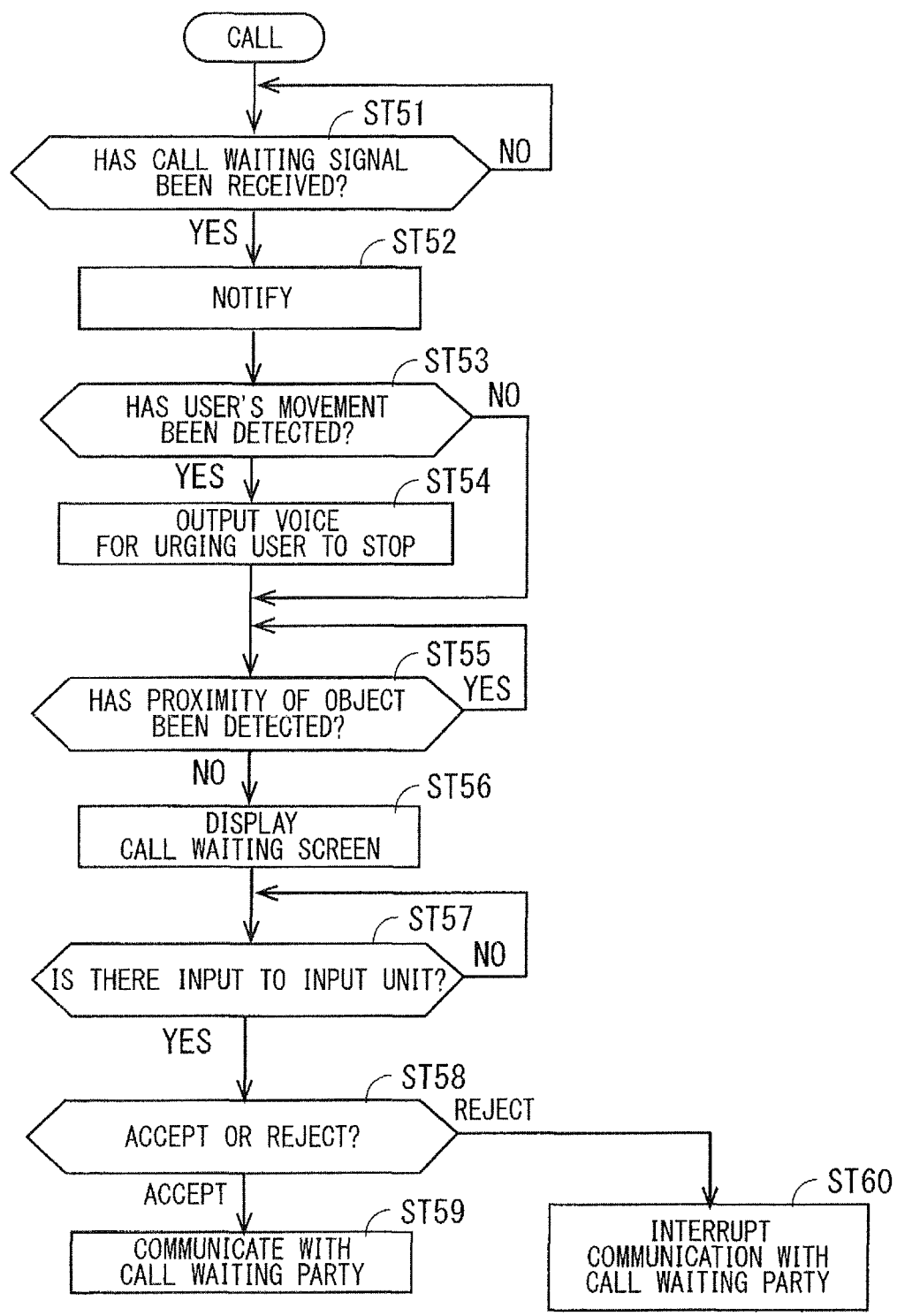
FIG. 16 illustrates a flowchart showing an example of a specific action of the call processor.

FIG. 16 illustrates a flowchart showing an example of a specific action of the mobile electronic apparatus 1. FIG. 16 illustrates an example action for a call waiting during a call, where steps ST51 and ST52 are identical to steps ST31 and ST32, respectively. In step ST53 after step ST52, the incoming call processor 111 determines whether the movement detector 80 has detected a user's movement. If determining that the movement detector 80 has detected a user's movement, in step ST54, the incoming call processor 111 outputs a voice for urging the user to stop through, for example, the first sound output unit 42.

After step ST54 or if a negative determination is made in step ST53, in step ST55, the incoming call processor 111 determines whether the proximity detector 82 has detected the proximity of an object. If determining that the proximity detector 82 has detected the proximity of an object, step ST55 is performed again. If the incoming call processor 111 determines that the proximity detector 82 has not detected the proximity of an object, in step ST56, the incoming call processor 111 displays a call waiting screen on the display 41. Next, steps ST57 to ST60 are performed. Here, steps ST56 to ST60 are identical to steps ST40, ST41, and ST37 to ST39, respectively.

As described above, according to steps ST51 to ST54, the user can listen to a voice for urging the user to stop when receiving a call waiting signal while moving. The user thus stops and then responds to a call waiting.

If a user's movement is detected even once after the receipt of a first incoming call signal, a voice for urging the user to stop may be output in response to the receipt of a call waiting signal.

Brightness Control

FIG. 17 schematically illustrates an example of an internal configuration of the controller 10. With respect to FIG. 8, the controller 10 of FIG. 17 includes a brightness controller 130 in place of the warning display unit 120. Here, the controller 10 of FIG. 17 may include the warning display unit 120.

The brightness controller 130 can control the brightness of the display 41. The brightness of the display 41 herein refers to the overall brightness of the display 41, and may be, for example, an average value of the brightnesses of all of the pixels of the display 41. The brightness controller 130 reduces the brightness of the display 41 when a user's movement is detected during the receipt of an incoming call signal. For example, in the case in which the display 41 is a liquid crystal display panel, the brightness controller 130 may reduce the brightness of a backlight.

Figure 18:
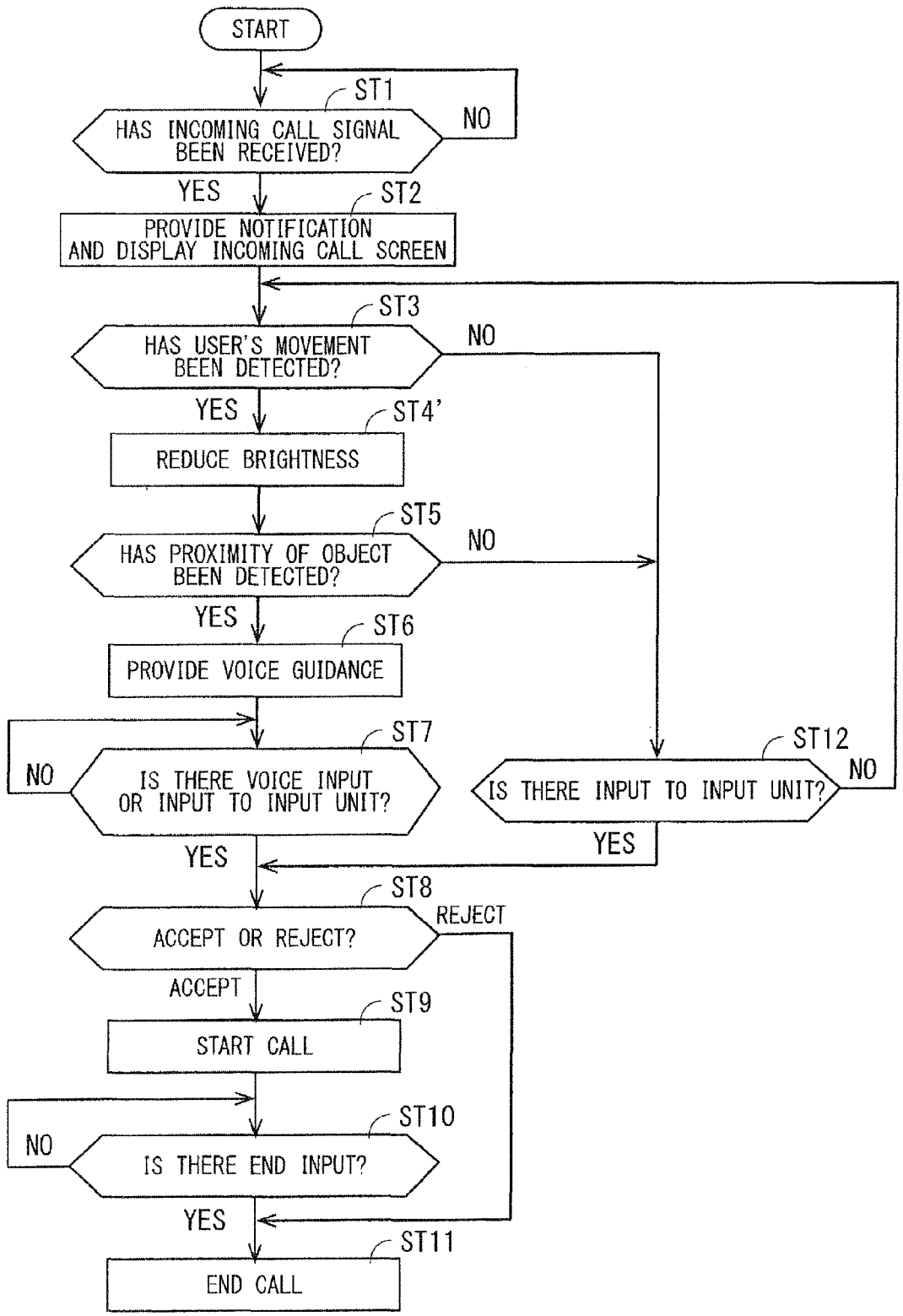
FIG. 18 schematically illustrates an example of an electrical configuration of the mobile electronic apparatus.

FIG. 18 illustrates a flowchart showing an example of a specific action of the mobile electronic apparatus 1. With reference to FIG. 18, step ST4' is performed in place of step ST4 with respect to FIG. 9. In the case in which the controller 10 includes the warning display unit 120, step ST4 may be performed before or after step ST4'.

When an affirmative determination is made in step ST3, step ST4' is performed. In step ST4, the brightness controller 130 reduces the brightness of the display 41. Subsequently, step ST5 is performed.

In step ST4', the display 41 darkens when the user receives an incoming call signal while moving, and accordingly, the user cannot readily look at the display 41. Thus, the user is likely to adopt identification of a calling party by readout compared with identification of a calling party on the display 41. Specifically, the user is likely to adopt safer identification of a calling party.

Notification of Incoming Call Signal

When detecting a user's movement and the proximity of an object while outputting a sound (also referred to as a ringtone) from the second sound output unit 44 in response to the receipt of an incoming call signal, the incoming call processor 111 may stop outputting the ringtone. This can avoid a situation in which a user cannot readily catch the readout of the information on an incoming party due to a ringtone.

The mobile electronic apparatus 1 may include a vibration unit (not shown). The vibration unit is a "vibrator" and is controlled by the controller 10 to vibrate. The vibrations of the vibration unit are transmitted to the user through a case of the mobile electronic apparatus 1. In the receipt of an incoming call signal, thus, the incoming call processor 111 may vibrate the vibration unit and notify the user of the receipt of the incoming call signal. Alternatively, the mobile electronic apparatus 1 may include a light emitting unit (not shown). The light emitting unit comprises, for example, LEDs. In the receipt of an incoming call signal, the incoming call processor 111 may cause the light emitting unit to emit light to notify the user of the receipt of an incoming call signal.

When detecting a user's movement and the proximity of an object during the receipt of an incoming call signal, the incoming call processor 111 may provide a notification using the vibration unit or the light emitting unit without providing a notification using the second sound output unit 44. The user can accordingly confirm that the user has received the incoming call signal.

Modifications

Figure 19:
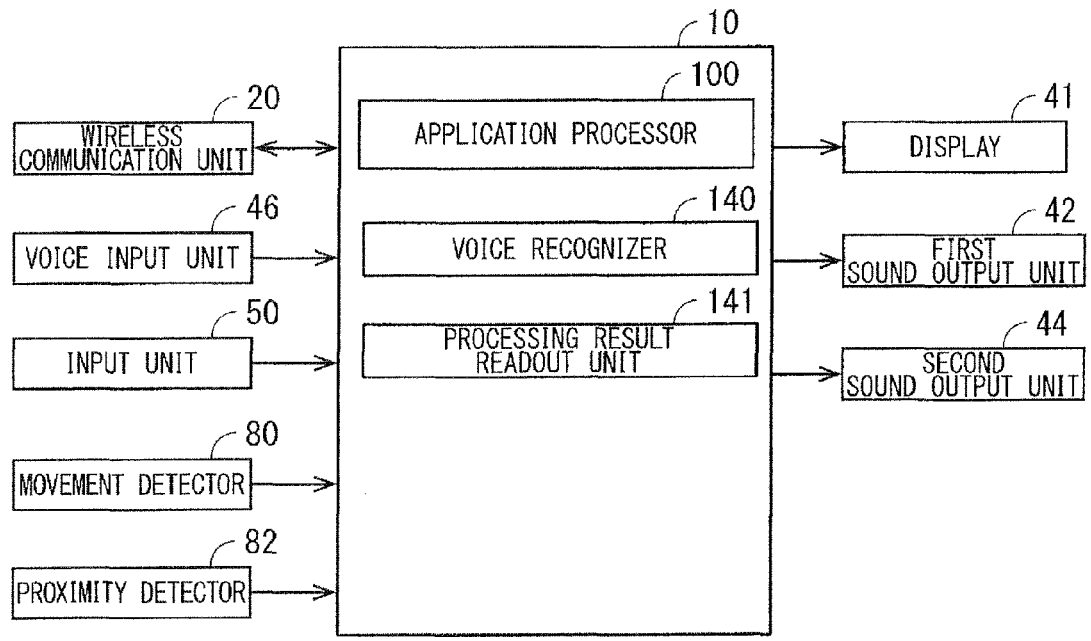
FIG. 19 schematically illustrates an example configuration of a controller.

The examples above have described the action at the occurrence of an incoming call. The descriptions herein are not limited to the action at the occurrence of an incoming call. FIG. 19 schematically illustrates an example of an internal configuration of the controller 10. The controller 10 of FIG. 19 includes the application processor 100 and a voice recognizer 140.

When the movement detector 80 detects a user's movement, the controller 10 can validate a voice input. Specifically, when a user's movement is detected, the function of the voice recognizer 140 is executed. The voice recognizer 140 recognizes a word of the sound signal entered from the voice input unit 46. The controller 10 performs a process correspondingly to the word recognized by the voice recognizer 140. For example, in the case in which the word recognized by the voice recognizer 140 indicates an instruction to the application processor 100, the voice recognizer 140 notifies the application processor 100 of the instruction, and the application processor 100 performs a process corresponding to the instruction.

In a more specific example, in the case in which the application processor 100 can execute an email function, words for instructing the check, creation, or transmission of emails are set in advance. When the word recognized by the voice recognizer 140 indicates this instruction, the application processor 100 performs a process corresponding to the instruction.

In the illustration of FIG. 19, the controller 10 also includes a processing result readout unit 141. The processing result readout unit 141 can read out the processing result of the voice input. For example, when a voice input for instructing the user to check a received email is performed, the application processor 100 outputs, to the processing result readout unit 141, the text information indicating a sender of the received email and the content of the email. The processing result readout unit 141 generates a sound signal for reading out the text information and outputs the sound signal to, for example, the first sound output unit 42. When the first sound output unit 42 outputs the sound signal as a voice, the sender and the content of the received email are read out.

As descried above, when a user's movement is detected, a voice input is validated. In the voice input, the user does not need to focus the user's line of sight on the mobile electronic apparatus 1, and can thus perform an input to the mobile electronic apparatus 1 while seeing the surroundings even while moving. Moreover, in the case in which the controller 10 includes the processing result readout unit 141, a processing result of the input is read out. The user does not need to concentrate the user's line of sight on the mobile electronic apparatus 1 to catch the processing result, and thus, can catch the processing result while seeing the surroundings even while moving.

When the proximity detector 82 detects the proximity of an object, the processing result readout unit 141 may output a processing result as a voice through the first sound output unit 42. Thus, an output of the processing result can be avoided while the user is not in such a position as to catch the sound of the first sound output unit 42.

The controller 10 validates a voice input when the movement detector 80 detects a user's movement in the examples above. Alternatively, the controller 10 may validate a voice input when the movement detector 80 detects the proximity of an object in addition to a user's movement.

The controller 10 may invalidate a voice input when a user's movement is not detected. This can avoid an unnecessary operation of the voice recognizer 140, thus avoiding unnecessary power consumption. Further, the controller 10 may invalidate a voice input also when the proximity of an object is not detected while a user's movement is detected. This is a process reflecting that the user performs a voice input while assuming the call position. Specifically, the user does not assume the call position when the proximity of an object is not detected, so a voice input is invalidated. An unnecessary action of the voice recognizer 140 can thus be avoided, thus avoiding unnecessary power consumption.

Figure 20:
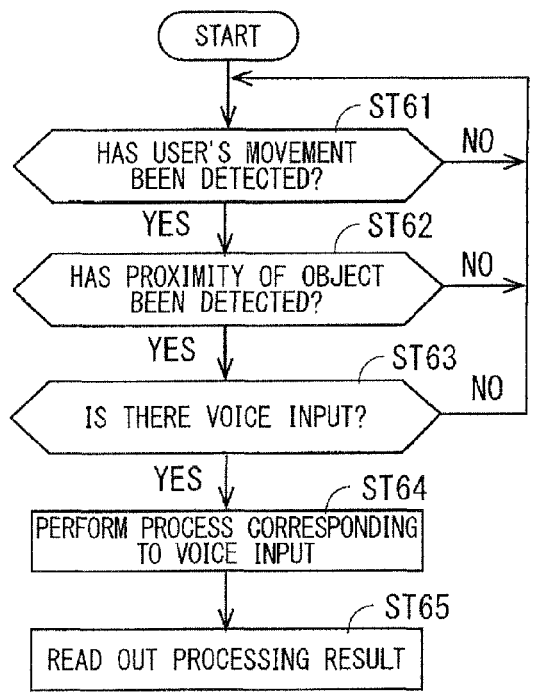
FIG. 20 schematically illustrates an example of an electrical configuration of the mobile electronic apparatus.

FIG. 20 illustrates a flowchart showing an example of a specific action of the controller 10 described above. In step ST61, first, the controller 10 determines whether the movement detector 80 has detected a user's movement. If the controller 10 determines that the movement detector 80 has not detected a user's movement, step ST61 is performed again. If determining that the movement detector 80 has detected a user's movement, in step ST62, the controller 10 determines whether the proximity detector 82 has detected the proximity of an object. If the controller 10 determines that the proximity detector 82 has not detected the proximity of an object, step ST61 is performed again. If the proximity detector 82 has detected the proximity of an object, in step ST63, the voice recognizer 140 determines whether a voice input has been performed. Specifically, the voice recognizer 140 determines whether a sound signal from the voice input unit 46 includes a word corresponding to the input. If the voice recognizer 140 determines that the sound signal from the voice input unit 46 includes no word corresponding to the input, or, if the voice recognizer 140 determines that a voice input has not been performed, step ST61 is performed again. If the voice recognizer 140 determines that a voice input has been performed, in step ST64, the controller 10 performs a process corresponding to the voice input. In step ST65, next, the processing result readout unit 141 outputs a processing result as a voice through the first sound output unit 42.

While the examples above have described a voice input for an email and readout of a processing result of the voice input, embodiments of the present disclosure are not limited thereto. For example, when the application processor 100 can execute a navigation function, a voice for guiding a route to a destination may be read out through a voice input of the destination. Alternatively, a current time may be read out in response to a voice input for checking a time. The current time can be clocked by a time circuit (for example, a timer circuit). Still alternatively, a schedule may be read out in response to a voice input for checking the schedule. The user enters the schedule in advance using the input unit 50.

While the mobile electronic apparatus has been described above in detail, the above description is in all aspects illustrative and not restrictive, and the mobile electronic apparatus is not limited thereto. It is understood that numerous modifications which have not been exemplified can be devised without departing from the scope of the present disclosure.

Embodiments are applicable in combination as long as they are not mutually inconsistent.

What is claimed is:

1. A mobile electronic apparatus comprising:
   a wireless communication unit configured to receive an incoming call signal;
   a sound output unit;
   a movement detector configured to detect a user's movement;
   a proximity sensor configured to detect proximity of an object;
   at least one processor configured to output as a voice, through the sound output unit, information on a party that has transmitted the incoming call signal when the user's movement and the proximity of the object are detected during the receipt of the incoming call signal; and
   an acceleration detector configured to detect accelerations in a first direction and a second direction generated in the mobile electronic apparatus,
   wherein the at least one processor is configured to:
      start a call when the user's movement is detected during the receipt of the incoming call signal and when the acceleration in the first direction is greater than a reference value, and
      end the call when the user's movement is detected during the receipt of the incoming call signal and when the acceleration in the second direction is greater than a reference value.

2. The mobile electronic apparatus according to claim 1, further comprising:
   a voice input unit,
   wherein the at least one processor is configured to
      recognize a content of a sound signal input from the voice input unit, and
      perform, when the user's movement is detected during the receipt of the incoming call signal and when the content of the sound signal corresponds to an acceptance to the incoming call signal, a process corresponding to the acceptance.

3. The mobile electronic apparatus according to claim 1, further comprising a motion detector configured to detect a spatial motion of the mobile electronic apparatus,
   wherein the at least one processor ends a call when the user's movement is detected during, the call and when a motion of the mobile electronic apparatus along a predetermined path is detected.

4. The mobile electronic apparatus according to claim 1, wherein when the user's movement is detected while the wireless communication unit receives a call waiting signal, the at least one processor outputs as a voice, through the sound output unit, information on a party that has transmitted the call waiting signal.

5. The mobile electronic apparatus according to claim 1, further comprising
   a display,
   wherein the at least one processor is configured to
      display a warning on the display when the user's movement is detected during the receipt of the incoming call signal, and
      output as a voice, through the sound output unit, the information on the party that has transmitted the incoming call signal when the user's movement and the proximity of the object are detected during the display of the warning.

6. The mobile electronic apparatus according to claim 5, further comprising
   an input unit configured to receive an input for ending, the display of the warning,
   wherein the at least one processor provides no sound output of the information on the party through the sound output unit when the input has been performed.

7. The mobile electronic apparatus according to claim 1, further comprising
   a display,
   wherein the at least one processor reduces a brightness of the display when the user's movement is detected during the receipt of the incoming call signal.

8. A method for controlling a mobile electronic apparatus, the method comprising:
   receiving an incoming call signal by a wireless communication unit;
   outputting as a voice, through a sound output unit, information on a party that has transmitted the incoming call signal when a movement detector and a proximity sensor detect a user's movement and proximity of an object, respectively, during the receipt of the incoming call signal;
   detecting a spatial motion of the mobile electronic apparatus;
   starting a call when the user's movement is detected during the receipt of the incoming call signal and when a motion of the mobile electronic apparatus along a first path is detected; and
   ending the call when the user's movement is detected during the receipt of the incoming call signal and when a motion of the mobile electronic apparatus along a second path is detected.

9. A non-transitory computer readable recording medium that stores a control program fOr controlling a mobile electronic apparatus, the control program causing the mobile electronic apparatus to execute the steps of:
   receiving an incoming call signal by a wireless communication unit;
   outputting as a voice, through a sound output unit, information on a party that has transmitted the incoming call signal when a movement detector and a proximity sensor detect a user's movement and proximity of an object, respectively, during the receipt of the incoming call signal;
   detecting accelerations in a first direction and a second direction generated in the mobile electronic apparatus;
   starting a call when the user's movement is detected during the receipt of the incoming call signal and when the acceleration in the first direction is greater than a reference value; and ending the call when the user's movement is detected during the receipt of the incoming call signal and when the acceleration in the second direction is greater than a reference value.

* * * * *